United States Patent [19]

Higashitsutsumi

[11] Patent Number: 5,144,445
[45] Date of Patent: Sep. 1, 1992

[54] SOLID-STATE IMAGE PICKUP APPARATUS HAVING A PLURALITY OF PHOTOELECTRIC TRANSDUCERS ARRANGED IN A MATRIX

[75] Inventor: Yoshihito Higashitsutsumi, Gifu, Japan

[73] Assignee: Sanyo Electric Co., Ltd., Osaka, Japan

[21] Appl. No.: 630,282

[22] Filed: Dec. 19, 1990

[30] Foreign Application Priority Data

Dec. 26, 1989 [JP] Japan ................................. 1-337358
Dec. 26, 1989 [JP] Japan ................................. 1-337359
Jun. 28, 1990 [JP] Japan ................................. 2-171519

[51] Int. Cl.$^5$ ...................... H04N 3/14; H04N 5/335; H04N 7/04
[52] U.S. Cl. ............................. 358/213.11; 358/209; 358/152; 358/146
[58] Field of Search .................. 358/213.11, 209, 152, 358/146, 213.26, 12

[56] References Cited

U.S. PATENT DOCUMENTS

| | | | |
|---|---|---|---|
| 3,180,931 | 4/1965 | Morchand | 358/146 |
| 3,256,386 | 6/1966 | Morchand | 358/146 |
| 3,916,092 | 10/1975 | Justice | 358/12 |
| 3,953,666 | 4/1976 | Justice et al. | 358/12 |
| 4,561,020 | 12/1985 | Matsuda | 358/146 |
| 4,701,793 | 10/1987 | den Hollander et al. | 358/152 |
| 4,788,540 | 11/1988 | Tokumitsu et al. | 358/152 |
| 5,040,070 | 8/1991 | Higashitsutsumi et al. | 358/213.25 |

FOREIGN PATENT DOCUMENTS 2250579 3/1989 Japan .

Primary Examiner—Michael Razavi
Assistant Examiner—Wendy R. Greening
Attorney, Agent, or Firm—Spensley Horn Jubas & Lubitz

[57] ABSTRACT

A video signal obtained by a solid-state image pickup device is supplied to a display apparatus to display an image. The number of the pixels of the solid-state image pickup device is smaller (e.g., ¼) than that of the screen of the display apparatus. The transfer clock of the solid-state image pickup device is so controlled that the video signal output therefrom corresponds to an image displayed at the region of ¼ of the reproducing screen. The video signals from four solid-state image pickup devices are compounded so as to display an image composed of four divided images on one screen. A synchronizing signal which is a reference for the transfer clock is transmitted from the display apparatus so as to synchronize the four video signals. In another mode, the transfer clock is so controlled as to enlarge a video signal which corresponds to an image for the ¼ region of the reproducing signal and display the image on the entire part of the reproducing screen.

15 Claims, 17 Drawing Sheets

SOLID-STATE IMAGE PICKUP APPARATUS HAVING A PLURALITY OF PHOTOELECTRIC TRANSDUCERS ARRANGED IN A MATRIX

BACKGROUND OF THE INVENTION

1. Field of the Invention

The present invention relates to a solid-state image pickup apparatus for supplying a video signal to a display unit.

2. Description of the Related Art

A monitoring system or the like which uses a plurality of TV cameras is so designed as to enable the simultaneous reproduction of video signals of the respective TV cameras. When such a plurality of reproduced pictures are displayed, a method of displaying the images picked up by the respective TV cameras on the corresponding TV monitors, a method of displaying the plurality of pictures on one TV monitor by time sharing, or a method of displaying the pictures by dividing the screen of the TV monitor into the corresponding number of regions is adopted. In a general monitoring system, only the reproduction of a plurality of pictures is required and since a high resolution is not particularly necessary in most cases, there is a tendency to adopt a method of displaying a plurality of reproduced pictures on one TV monitor with the reproducing screen divided into the corresponding number of regions.

FIG. 1 is a block diagram of the structure of an image pickup system for displaying a plurality of reproduced pictures on one TV monitor. In FIG. 1, four TV cameras 1 to 4 are used for displaying four reproduced pictures on one TV monitor 5.

Each of the TV cameras 1 to 4 is connected in parallel to a main controller 6 and video signals $Y_1$ to $Y_4$ which are output from the respective TV cameras 1 to 4 are input to the main controller 6. The main controller 6 is provided with a synchronizing signal generator 6a, a screen controller 6b and a field memory 6c, and not only synchronizes the operation of each of the TV cameras 1 to 4 at a predetermined timing but also compounds the video signals $Y_1$ to $Y_4$ into a composite video signal $Y_m$ for simultaneously displaying the four images on the same screen, and supplies the composite video signal $Y_m$ to the TV monitor 5.

The synchronizing signal generator 6a supplies a synchronizing signal SY to each of the TV cameras 1 to 4 so as to make TV cameras 1 to 4 have the same operation timing. The screen controller 6b reduces the video signals $Y_1$ to $Y_4$ obtained from the TV cameras 1 to 4, respectively, to ½ both in the horizontal scanning period and in the vertical scanning period, temporarily stores the picture information which corresponds to the four pictures in the field memory 6c and reads out the image information from the field memory 6c in a predetermined order so as to generate the composite video signal $Y_m$. To be more precise, the video signals $Y_1$ to $Y_4$ are stored in the field memory 6c with the data thereof culled out on every other pixel both in the horizontal scanning period and in the vertical scanning period, and the image information which corresponds to the images from the TV cameras 1 to 4 is read out in every ½ horizontal scanning period and every ½ vertical scanning period to generate the composite video signal $Y_m$.

For example, in the case of displaying pictures on the four divided regions A to D, as shown in FIG. 2, in the former ½ vertical scanning period, the picture information which corresponds to the video signal $Y_1$ is read out in the former ½ horizontal scanning period and the image information which corresponds to the video signal $Y_2$ is read out in the latter ½ horizontal scanning period. In the latter ½ vertical scanning period, the image information which corresponds to the video signal $Y_3$ is read out in the former ½ horizontal scanning period and the picture information which corresponds to the video signal $Y_4$ is read out in the latter ½ horizontal scanning period. In this way, the images picked up by the TV cameras 1 to 4 are simultaneously displayed in the divided regions A to D, respectively, of the reproducing screen.

In the above-described image pickup system, the main controller 6 is inevitable for not only controlling the operations of the plurality of TV cameras 1 to 4 but also generating the composite video signal $Y_m$ for producing the four divided reproduced pictures from the video signals $Y_1$ to $Y_4$. Such a main controller 6 requires a large-scale circuit structure such as the field memory 6c for storing the image information for at least four pictures and the screen controller 6b for reading out the image information from the field memory 6c and compounding it. A plurality of circuits for connecting the TV cameras are also necessary. Thus, this kind of image pickup system suffers from a high cost.

In addition, since the video signals $Y_1$ to $Y_4$ obtained from the TV cameras 1 to 4 are culled in the horizontal and vertical directions and compacted, the resolution intrinsic to each of the TV cameras 1 to 4 is not made the most of and the system involves much waste.

SUMMARY OF THE INVENTION

Accordingly, it is an object of the present invention to eliminate the waste of the TV cameras in a solid-state image pickup apparatus and simplify the circuits for connecting the TV cameras so as to greatly reduce the cost.

It is another object of the present invention to provide a solid-state image pickup apparatus which is enable of simplifying the circuits for connecting the TV cameras so as to greatly reduce the cost of the image pickup system.

It is still another object of the present invention to provide a solid-state image pickup apparatus which can produce a high-quality reproduced picture by using a solid-state image apparatus having a small number of pixels.

A first characteristic feature of the present invention lies in that a solid-state image pickup apparatus is provided with a solid-state image pickup device the number of pixels of which is equivalent to 1/n of the number of the pixels of a reproducing screen in the vertical direction and generating information charges which correspond to an image pattern by the photoelectric conversion of the image to which light is projected, a driving means for transferring the information charges in the vertical direction by driving a vertical transfer means and a horizontal transfer means and transferring the information charges which have been transferred in the vertical direction to each line in the horizontal direction and a timing control means for setting the operation timing of the driving means in correspondence with the synchronizing signal of the reproducing screen and in that the driving means transfers the optical charges in the horizontal direction in the period 1/n of the horizontal scanning period of the reproducing screen so as to obtain a video signal for displaying an image which is 1/n as large as the reproducing screen in both horizontal and vertical directions in a specified region of the reproducing screen in accordance with the operation timing which has been set by the timing control means.

A second characteristic feature of the present invention lies in that the driving means transfers the optical charges in the vertical direction in the period of 1/n of the vertical scanning period of the reproducing screen and transfers the optical charges in the horizontal direction in the period of 1/n of the horizontal scanning period of the reproducing screen so as to obtain a video signal for displaying an image which is 1/n as large as the reproducing screen in both horizontal and vertical directions in a special range of the reproducing screen in accordance with the operation timing which has been set by the timing control means.

The method of displaying an image on a reproducing screen by using the solid-state image pickup apparatus for displaying an image in a specific region of the reproducing screen as described above is characterized in that a plurality of the solid-state image pickup apparatuses are connected, in that the driving means of the respective solid-state image pickup apparatuses are operated in accordance with a common synchronizing signal, in that timings which are different from each other by a multiple of 1/n of the horizontal scanning period and the vertical scanning period are set by the respective timing control means and in that the video signals obtained from the respective solid-state image pickup apparatuses are compounded, thereby displaying the images of the respective solid-state image pickup apparatuses on the corresponding regions which are obtained by dividing the reproducing screen into n regions in both horizontal and vertical directions.

Since the solid-state image pickup device is driven for the period of 1/n of the horizontal scanning period and the vertical scanning period, the driving timing is set as desired within the horizontal scanning period and the vertical scanning period and a video signal is output in a specific period in the horizontal scanning period and the vertical scanning period, it is possible to display the picture 1/n as large as the reproducing screen at a given position of the reproducing screen in accordance with the set driving timing.

Since a plurality of solid-state image pickup apparatuses in which the solid-state image pickup devices are driven for the period of 1/n of the horizontal scanning period and the vertical scanning period are connected and timings which are different from each other by a multiple of 1/n of the horizontal scanning period and the vertical scanning period are set by the respective timing control means, the solid-state image pickup apparatuses are subsequently driven in the horizontal scanning period and the vertical scanning period and the video signals are obtained from the respective solid-state image pickup apparatuses without being overlapped with each other. It is therefore possible to simultaneously display the plurality of images on the corresponding regions which are obtained by dividing the reproducing screen by compounding the respective video signals.

A third characteristic feature of the present invention lies in that a detection circuit for detecting a synchronizing signal and communication data from a communication line to which a television synchronizing signal and various communication data are transmitted, a timing control means for setting the timings of driving circuits in accordance with the synchronizing signal and a data processor for judging the contents of the communication data and changing the scanning timing of the timing control means in accordance with the contents of the data are provided and a video signal synchronous with the synchronizing signal is supplied to the communication line.

It is therefore possible both to selectively operate the plurality of solid-state image pickup apparatuses which are connected to a common communication line and to obtain the video signals with the same scanning timing from the respective solid-state image pickup apparatuses by providing various communication data for controlling the operation for the solid-state image pickup apparatuses in a period overlapping with the specific period of the synchronizing signal. Consequently, it is possible to connect the solid-state image pickup apparatuses the number of which can be designated by the communication data to the same communication line without the need for adding a special circuit, thereby simplifying the circuit.

It is also possible to utilize a solid-state image pickup apparatus as a communication terminal by providing a communication data transmission circuit for the solid-state image pickup apparatus.

A fourth characteristic feature of the present invention lies in that a timing controlling means is provided for setting the timings for vertically transferring the information charges which correspond to the vertical pixels the number of which is ½ that of the horizontal scanning lines of a reproducing screen so that the timings in the odd and even fields are different from each other by one horizontal scanning period.

Therefore video signals which indicate image information are alternately obtained in the odd and even fields at intervals of two horizontal scanning periods. When these video signals are reproduced by non-interlaced scanning, the horizontal scanning lines are alternately drawn on odd lines and even lines in each field and a picture with the horizontal scanning lines arranged at uniform intervals in the on the entire area of the reproducing screen.

In this way, the present invention also provides a method of producing an image for one producing screen by using a solid-state image pickup device having ¼ as many pixels as the pixels of the reproducing screen. Relating to this technique, the applicant of the present invention has already proposed a solid-state image pickup apparatus which enables the use of a solid-state image pickup device having a small number of pixels and a low resolution in Japanese Patent Laid-Open No. 20458/1988. FIG. 3 is a block diagram of this structure of the solid-state image pickup apparatus and FIG. 4 shows the operation timing thereof.

A CCD solid-state image pickup device 11 of a frame transfer system is composed of an image pickup portion 11I, a storing portion 11S and a horizontal transfer portion 11H. The numbers of the pixels of the image pickup portion 11S in the vertical and horizontal directions are respectively reduced to ¼ of the number of the pixels of the conventional image pickup device. For example, in the case of the image pickup portion 11I for the NTSC system, 120 vertical pixels and 162 horizontal pixels per field are formed (conventionally, 240 vertical pixels and 324 horizontal pixels per field). The CCD (11) is driven in pulsation by a transfer clock generator 12, and a vertical transfer clock $\phi_V$, a storing transfer clock $\phi_S$ and a horizontal transfer clock $\phi_H$ are supplied to the image pickup portion 11I, the storing portion 11S and the horizontal transfer portion 11H, respectively. These transfer pulses $\phi_V$, $\phi_S$ and $\phi_H$ are supplied to the respective portions of the CCD 11 in accordance with the timing signal generated by a timing controller 13 on the basis of a vertical synchronizing signal VD and a horizontal synchronizing signal HD.

In the CCD 11, since the numbers of the pixels in the vertical and horizontal directions are $\frac{1}{2}$ of those in a conventional one, when information charges are read out of the storing portion 11S at a transfer pulse having the same period as the horizontal scanning signal HD, the horizontal scanning lines obtained is $\frac{1}{2}$ as many as those in a conventional one which are necessary for constituting a television screen. Therefore, the frequencies of the storing transfer pulse $\phi_S$ and the horizontal transfer pulse $\phi_H$ are reduced to $\frac{1}{2}$ of the horizontal scanning signal HD. In other words, the information charges are transferred from the storing portion 11S to the horizontal transfer portion 11H at intervals of 2 H periods. Therefore, the video signal $X_{0(t)}$ is obtained from the CCD 11 at intervals of 2 H periods. The video signal $X_{0(t)}$ is an intermittent signal which exists for 1 H period every 2 H periods. In order to form the video signal $X_{0(t)}$ into a continuous signal, it is input to an interpolator 14. The interpolator 14 delays the video signal $X_{0(t)}$ by 1 H period by a delay circuit 14a so as to generate a video signal $X_{1(t)}$ and adds the video signal $X_{1(t)}$ to the video signal $X_{0(t)}$ by an adder 14b, thereby outputting a continuous a video signal $X_{(t)}$ every 1 H period.

The thus-obtained video signal X(t) is subjected to processings such as sample holding and amplification by a signal processor 15 and supplied to a TV monitor 16 in the form of a video signal $Y_{(t)}$.

According to this structure, from every signal, two horizontal scanning lines of the reproducing screen are obtained, so that it is possible to adopt a CCD having a small number of pixels as a TV camera.

Although this solid-state image pickup apparatus enables the improvement of the horizontal resolution by the interlaced driving of the CCD 11, the interpolator 14 in the solid-state image pickup apparatus causes the following inconvenience.

In the case of picking up the image of an object such as that shown in FIG. 5A, the images of the regions O1 to O3 are first picked up in the odd field ODD, so that the lines (solid lines) O1, O1 to O3 and O3 are drawn, as shown in FIG. 5B. The images of the regions E1 to E3 are then picked up in the even field EVEN, so that the lines (broken lines) E1, E1 to E3 and E3 are drawn, as shown in FIG. 5B. According to this process, some regions of the object are reversed on the reproducing screen, as is obvious from FIG. 5B. For example, although the region O2 is above the region E2 in the object, some portions of the region O2 is situated below the region E2 on the reproducing screen. Therefore, the improvement of the quality on the reproducing screen is not expected from the related art in spite of the interlaced driving of the CCD 11.

In the present invention, this defect is ameliorated.

The above and other objects, features and advantages of the present invention will become clear from the following description of the preferred embodiments thereof, taken in conjunction with the accompanying drawings.

DESCRIPTION OF THE PREFERRED EMBODIMENTS

An embodiment of the present invention will be explained hereinunder with reference to the accompanying drawings.

Figure 6A:
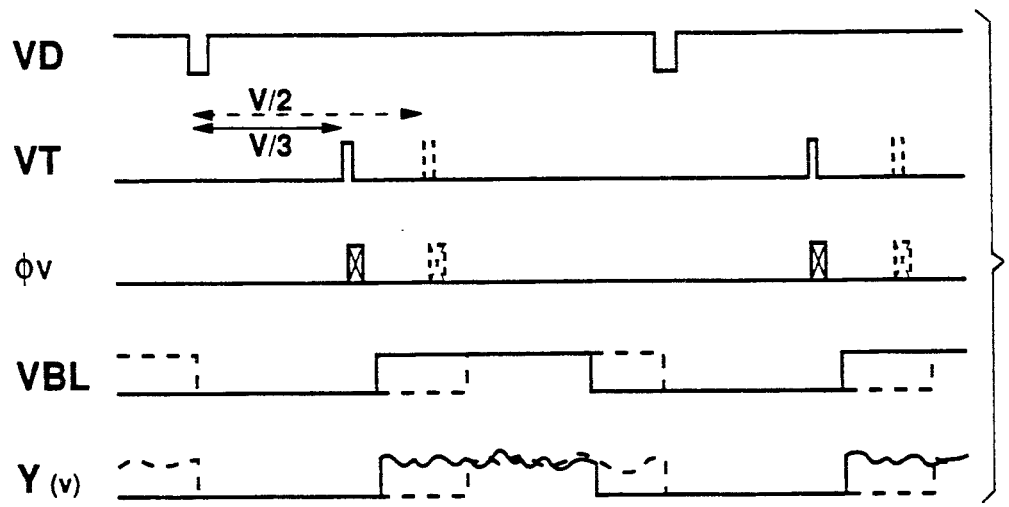
FIGS. 6a and 6b show the operation timing of an embodiment of a solid-state image pickup apparatus according to the present invention.
Figure 6B:
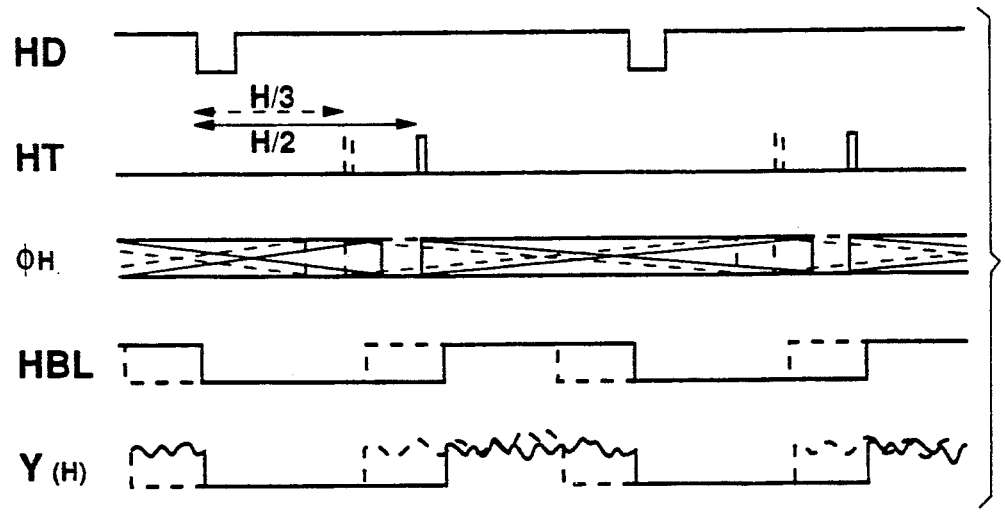
Figure 7:
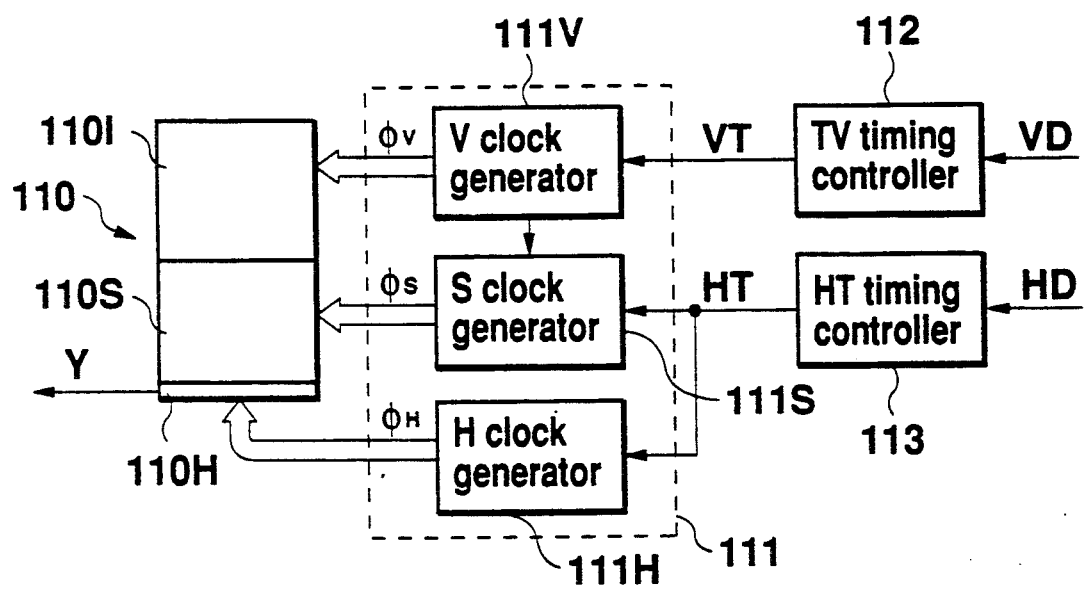
FIG. 7 is a block diagram of the structure of the embodiment shown in FIG. 6.

FIG. 6 shows the operation timing of an embodiment of a solid-state image pickup apparatus according to the present invention, wherein FIG. 6A shows the operation timing in a vertical scanning period (1V) and FIG. 6B the operation timing in a horizontal scanning period (1H). FIG. 7 is a block diagram of the structure of the embodiment shown in FIG. 6.

A CCD solid-state image pickup device 110 of a frame transfer system is composed of a pickup portion 110I, a storing portion 110S and a horizontal transfer portion 110H. Information charges produced on the pickup portion 110I by photoelectric conversion are temporarily stored in the storing portion 110S and the information charges stored in the storing portion 110S are output as a video signal Y through the horizontal transfer portion 110H. The number of the pixels of the CCD 110 in the vertical direction is set at ½ of the number of the pixels of the reproducing screen and the number of the pixels of the storing portion 110S is also set in correspondence therewith.

A driving circuit 111 for driving the CCD 110 is composed of a vertical transfer clock generator 111V for supplying a vertical transfer clock $\phi_V$ to the image pickup portion 110I, a storing transfer clock generator 111S for supplying a storing transfer clock $\phi_S$ to the storing portion 110S and a horizontal transfer clock generator 111H for supplying a horizontal transfer clock $\phi_H$ to the horizontal transfer portion 110H, and drives the CCD 110 in pulsation in accordance with the outputs of a vertical transfer timing controller 112 and a horizontal transfer timing controller 113. The vertical transfer clock generator 111V transfers the information charges for each screen to the storing portion 110S in accordance with a vertical transfer timing signal VT, while the storing transfer clock generator 111S transfers the information charges for each horizontal line to the horizontal transfer portion 110H in accordance with a horizontal transfer timing signal HT. The horizontal transfer clock generator 111H transfers the information charges which have been supplied from the storing portion 110S in the period of ½ of the horizontal scanning period 1H. Therefore, the displaying period of the video signal Y is reduced to ½ of 1V and 1H, respectively, as shown in FIG. 6, and the image reduced in size to ½ of a reproduced picture in the vertical and horizontal directions are displayed. The video signal Y is blanked by a vertical blanking signal VBL and a horizontal blanking signal HBL so as to eliminate noise in the period other than the displaying period.

Figure 8:
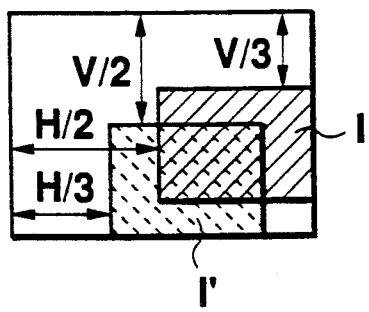
FIG. 8 schematically shows a reproduced picture by the embodiment shown in FIG. 6.

The vertical transfer timing controller 112 and the horizontal transfer timing controller 113 are operated in accordance with a vertical synchronizing signal VD and a horizontal synchronizing signal HD, respectively, and output the vertical transfer timing signal VT and the horizontal transfer timing signal HT, respectively, which provide transfer timings a constant period behind the falls of the respective vertical synchronizing signal VT and horizontal synchronizing signal HT. The vertical and horizontal transfer timing controllers 112, 114 set the delaying periods of the respective timing signals VT, HT with respect to the respective synchronizing signals VD, HD at 0 to V/2 and 0 to H/2, thereby assigning the position on the reproducing screen for displaying the image. For example, when the vertical transfer timing signal VT is set to be output V/3 behind the vertical synchronizing signal VD and the horizontal transfer timing signal HT is set to be output H/2 behind the horizontal synchronizing signal HD, as indicated by the solid lines in FIG. 6, an image (I) which is reduced in size to ½ in the vertical and horizontal directions is displayed on the reproducing screen at the reference position of ⅓ of the vertical length from the top and ¼ of the horizontal length from the left-hand side, as indicated by the solid line in FIG. 8. If the delay of the vertical transfer timing signal VT is changed to V/2 and the delay of the horizontal transfer timing signal HT is changed to H/3, as indicated by the broken lines in FIG. 6, the timings for the vertical transfer clock $\phi_V$, the horizontal transfer clock $\phi_H$, etc. are also changed, and an image (I') is displayed on the reproducing screen at the reference position of ½ of the vertical length from the top and ⅓ of the horizontal length from the right-hand side, as indicated by the broken line in FIG. 8. In this way, the vertical position for displaying the image is determined by the delay of the vertical transfer timing signal VT and the horizontal position for displaying the image is determined by the delay of the horizontal transfer timing signal HT. Since the displaying period of the video signal Y is ½ of the vertical scanning period and the horizontal scanning period, the delays of the timing signals VT, HT with respect to the respective synchronizing signals VD, HD are set at V/2, H/2, respectively, at the maximum so as to display the image without separation.

Although the size of an image displayed on the reproducing screen is reduced to ½ of the reproducing screen in the vertical and horizontal directions in this embodiment, it is possible to produce an image having a size of less than ½ of the reproducing screen in the vertical and horizontal direction by reducing the number of the pixels of the CCD 110 in the vertical direction and increasing the frequency of the horizontal transfer clock $\phi_H$ so as to transfer the information charges in the horizontal direction in a period of less than ½ of the horizontal scanning period.

Even if a CCD solid-state image pickup device having the same number of vertical pixels as the number of the pixels of the reproducing screen is used, the compaction of the image in the vertical direction is also possible by so designing the solid-state image pickup device as to shorten the period of the pulse for transferring the information charges to the horizontal transfer portion and complete the transfer of the information charges in a period of not more than ½ of the vertical scanning period. In this case, the information charges for not less than two pixels are mixed in the vertical transfer process.

Figure 9:
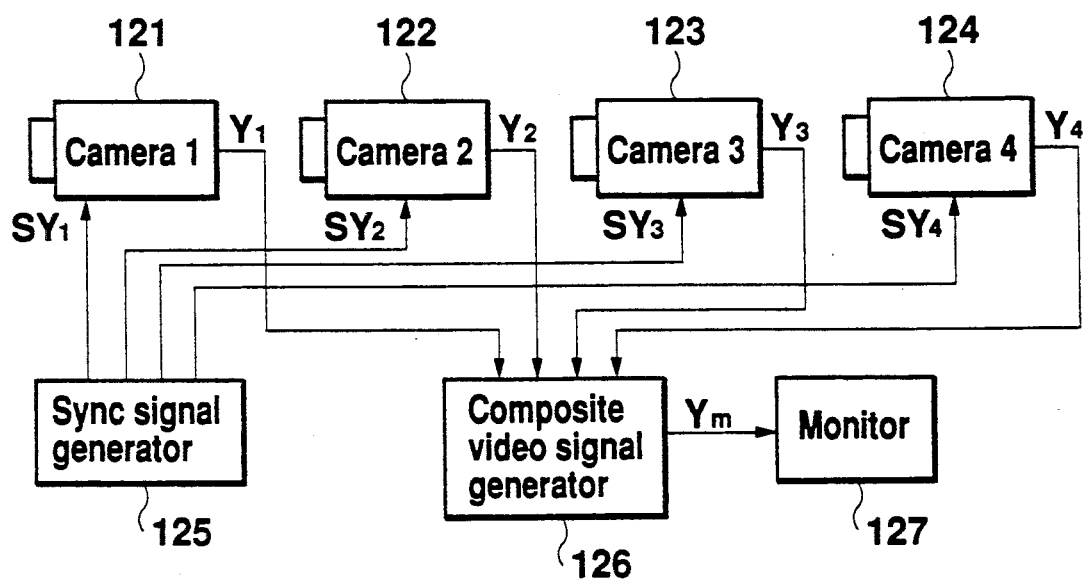
FIG. 9 is a block diagram of an image pickup system using the embodiment shown in FIG. 6.
Figure 10A:
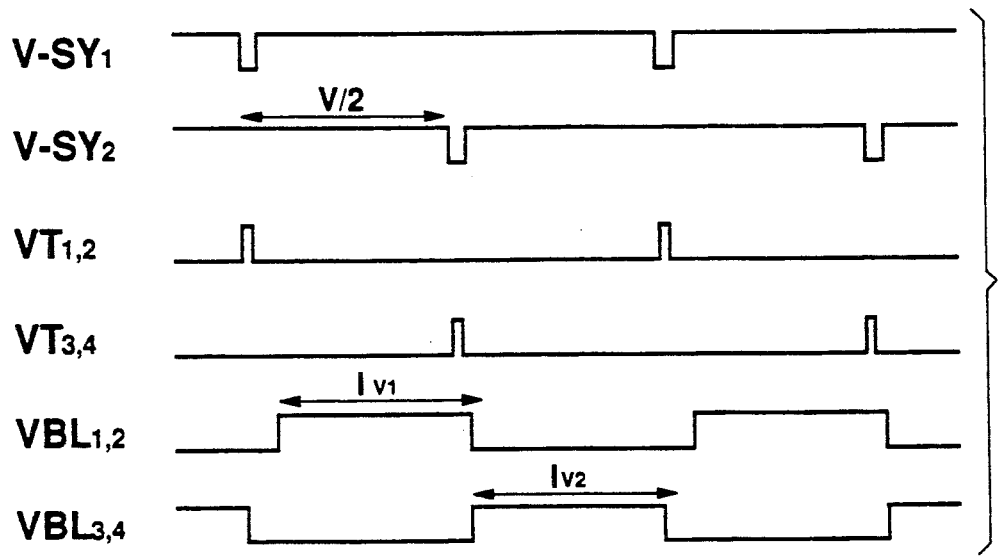
FIGS. 10a and 10b show the operation timing thereof.
Figure 10B:
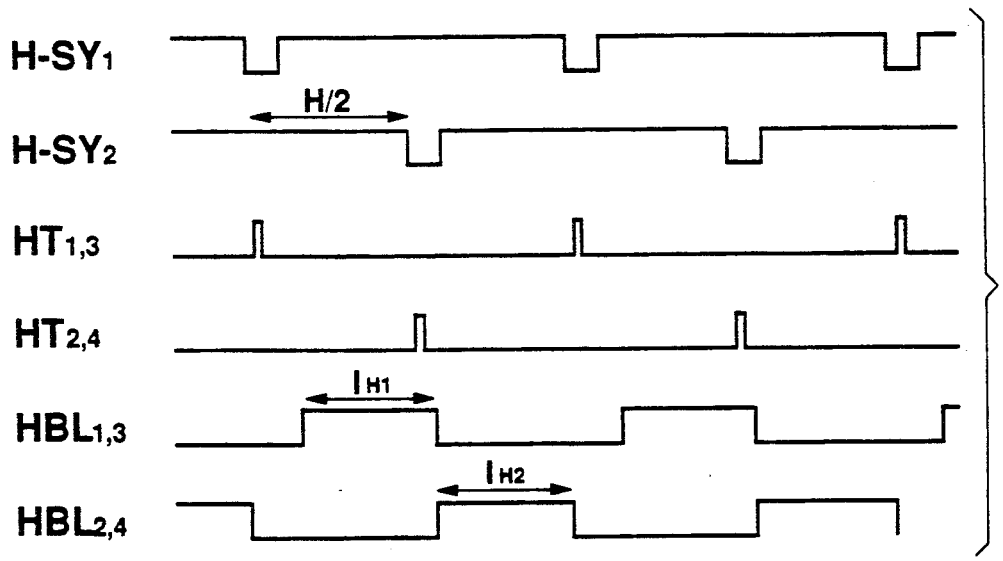

FIG. 9 is a block diagram of an image pickup system using the solid-state image pickup apparatus of this embodiment. A plurality of solid-state image pickup apparatuses are connected and the images of the respective solid-state image pickup apparatuses are simultaneously displayed on a TV monitor. FIG. 10 shows the operation timing of this system, wherein FIG. 10A shows the operation timing in a vertical scanning period (1V) and FIG. 10B the operation timing in a horizontal scanning period (1H).

Television cameras 121 to 124 have the structure shown in FIG. 7 and respectively output video signals $Y_1$ and $Y_4$ for displaying the images reduced in size to ½ in the vertical and horizontal directions. Synchronizing signals $SY_1$ to $SY_4$ are supplied from a synchronizing signal generator 125 to the respective television cameras 121 to 124 for synchronizing the respective operations and setting the timings for vertical scanning and horizontal scanning at delays of V/2 and H/2. The synchronizing signals $SY_1$ to $SY_4$ have a vertical synchronizing signal V-$SY_1$ or V-$SY_2$ and a horizontal synchronizing signal H-$SY_1$ or H-$SY_2$. By a combination of these synchronizing signals, the position on the reproducing screen for displaying the image is determined. The vertical synchronizing signal V-$SY_2$ is set at a delay of V/2 with respect to the vertical synchronizing signal V-$SY_1$ and the horizontal synchronizing signal H-$SY_2$ is set at a delay of H/2 with respect to the horizontal synchronizing signal H-$SY_1$. The vertical synchronizing signal V-$SY_1$ sets a displaying period $I_{V1}$ in the former half of the vertical scanning period 1V and the vertical synchronizing signal V-$SY_2$ sets a displaying period $I_{V2}$ in the latter half of the vertical scanning period 1V, while the horizontal synchronizing signal H-$SY_1$ sets a displaying period $I_{H1}$ in the former half of the horizontal scanning period 1H and the horizontal synchronizing signal H-SY$_2$ sets a displaying period I$_{H2}$ in the latter half of the horizontal scanning period 1H.

If a combination of the vertical synchronizing signal V-SY$_1$ and the horizontal synchronizing signal H-SY$_1$ is supplied to the TV camera 121 as the synchronizing signal SY$_1$ and similarly, combinations of V-SY$_1$ and H-SY$_2$, V-SY$_2$ and H-SY$_1$, and V-SY$_2$ and H-SY$_2$ to the TV cameras 122 to 123, respectively, as the synchronizing signals SY$_2$ to SY$_4$, the positions on the reproducing screen for displaying the images of the respective cameras do not overlap with each other. Therefore, the vertical transfer timing signals VT$_1$ to VT$_4$ for the respective cameras 121 to 124 are output so that VT$_1$ and VT$_2$ are output in accordance with V-SY$_1$ and VT$_3$ and VT$_4$ are output in accordance with V-SY$_2$, as shown in FIG. 10A, and the respective vertical blanking signals VBL$_1$ VBL$_4$ set the displaying periods I$_{V1}$ and I$_{V2}$ in accordance with the respective vertical transfer timing signals VT$_1$ to VT$_4$. On the other hand, the horizontal transfer timing signals H$_T$1 to HT$_4$ are output so that HT$_1$ and HT$_2$ are output in accordance with H-SY$_1$ and HT$_3$ and HT$_4$ are output in accordance with H-SY$_2$, as shown in FIG. 10B, and the respective horizontal blanking signals HBL$_1$ to HBL$_4$ set the displaying periods I$_{H1}$ and I$_{H2}$ in accordance with the respective horizontal transfer timing signals HT$_1$ to HT$_4$.

The video signals Y$_1$ to Y$_4$ with the respective displaying periods set as described above without overlapping with each other are compounded into a new video signal Y$_m$ by a composite video signal generator 126 and the composite video signal Y$_m$ is supplied to a TV monitor 127. Thus, the images which correspond to the respective video signals Y$_1$ to Y$_4$ are simultaneously displayed on the reproducing screen of the TV monitor 127, as shown in FIG. 11.

Figure 12:
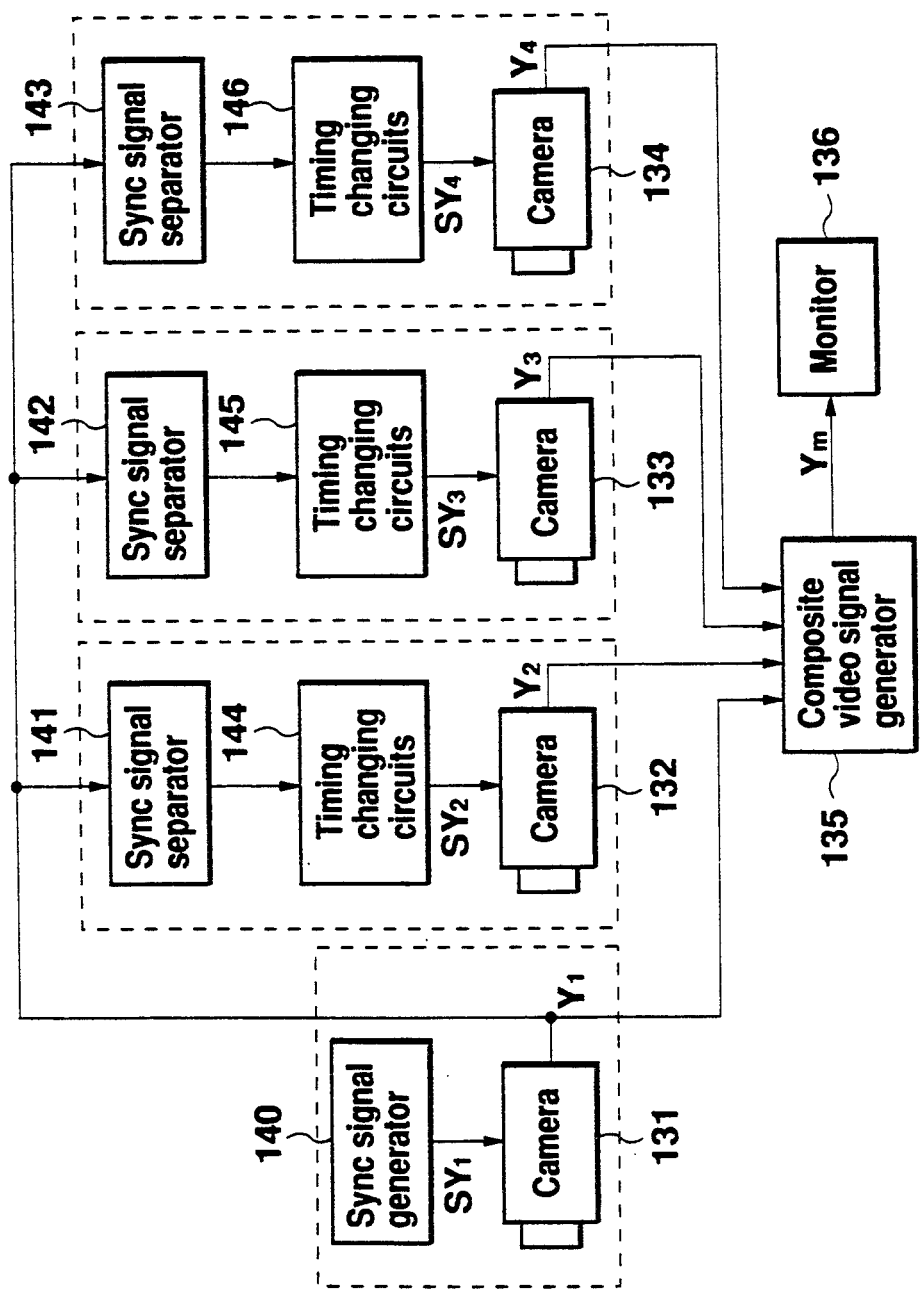
FIGS. 12 and 13 are block diagrams of other examples of an image pickup system.

FIG. 12 is a block diagram of another example of an image pickup system using the solid-state image pickup apparatus of this embodiment.

A reference TV camera 131 is equipped with a synchronizing signal generator 140 and the operation timing is set in accordance with the synchronizing signal SY$_1$ output from the synchronizing signal generator 140. TV cameras 132 to 134 are equipped with synchronizing signal separators 141 to 143, and timing changing circuits 144 to 146 are connected in parallel to the output of the reference TV camera 131. The synchronizing signal separators 141 to 143 separate the synchronizing signal SY$_1$ from the output of the TV camera 131, namely, the video signal Y$_1$ and supplies it to the timing changing circuits 144 to 146. The timing changing circuits 144 to 146 generate the synchronizing signals SY$_2$ to SY$_4$ by delaying the vertical synchronizing signal or the horizontal synchronizing signal by a constant period. For example, the timing changing circuit 144 delays only the horizontal synchronizing signal by H/2, the timing changing circuit 145 delays only the vertical synchronizing signal by V/2, and the timing changing circuit 146 delays both the vertical synchronizing signal and the horizontal synchronizing signal by V/2 and H/2, respectively. In this way, the synchronizing signals SY$_1$ to SY$_4$ agree with those shown in FIG. 9 and the operations of the respective TV cameras are carried out in accordance with the timings shown in FIG. 10. The video signals Y$_1$ to Y$_4$ output from the TV cameras 131 to 134 are compounded into the composite video signal Y$_m$ by a composite video signal generator 135.

Figure 11:
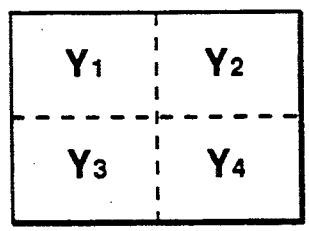
FIG. 11 shows the structure of a reproduced picture by the system shown in FIG. 9.

The composite video signal Y$_m$ is supplied to a TV monitor 136, whereby the images which correspond to the respective video signals Y$_1$ to Y$_4$ are simultaneously displayed on the reproducing screen of the TV monitor 136 in the same way as in FIG. 11.

Figure 13:
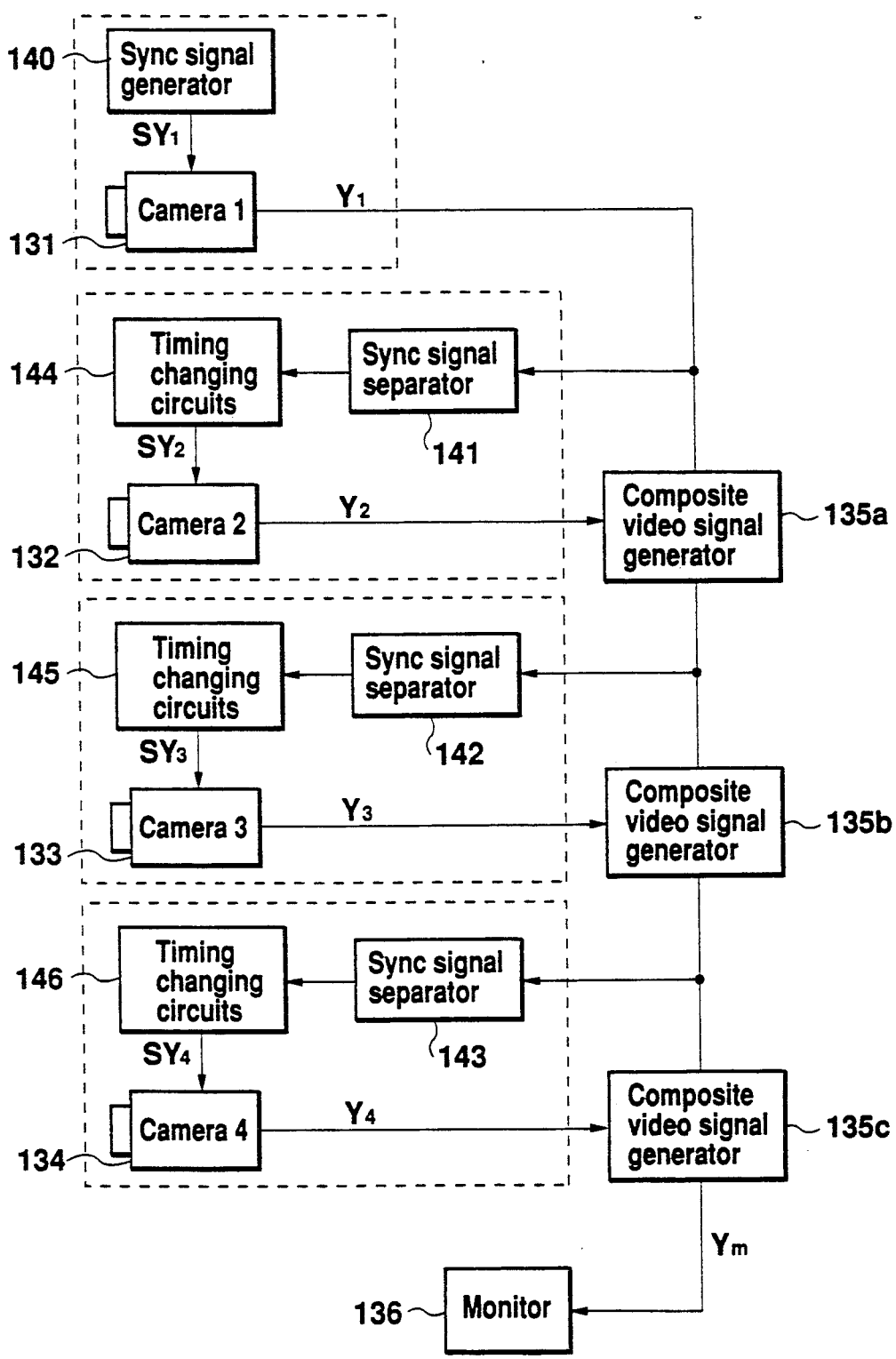

It is possible to connect the TV cameras 132 to 134 in series to the output of the reference TV camera 131, as shown in FIG. 13. In this case, a plurality of composite video signal generators 135a to 135c are provided on the output side of the TV cameras 131 to 134 and the video signals Y$_1$ to Y$_4$ are compounded in series so as to form the composite video signal Y$_m$. The thus-obtained composite video signal Y$_{mR}$ is the same as the video signal Y$_m$ compounded at one time as shown in FIG. 7. By supplying the composite video signal Y$_m$ to the TV monitor 136, it is possible to simultaneously display the images which correspond to the respective video signals Y$_1$ to Y$_4$ on the reproducing screen of the TV monitor 136.

In these examples, four images are displayed on one reproducing screen by connecting four TV cameras. It is also possible to display only necessary images on the reproducing screen by connecting five TV cameras or more and selectively operating these cameras, or to display not less than five, e.g., nine images on one reproducing screen by further shortening the displaying period set for each TV camera.

It is also possible to connect a part of TV cameras in series and the other cameras in parallel in order to efficiently connect the cameras when the number of the cameras connected is large.

According to this embodiment, the displaying period is set at any given period by setting the operation timing of a CCD, and a reduced image is displayed at any given position of a reproducing screen. In addition, even with a CCD having a low resolution, it is possible to produce an apparently high resolution by compacting the video signal.

Since it is possible to display a plurality of images on the same reproducing screen merely by compounding the video signals of a plurality of solid-state image pickup apparatuses while operating the solid-state image pickup apparatuses for different displaying periods, the connection between the solid-state image pickup apparatuses is simplified. Furthermore, since the solid-state image pickup device is sufficed with a small number of pixels, it is possible to reduce the scale of the solid-state image pickup apparatus itself, which leads to a great reduction in cost.

Figure 14:
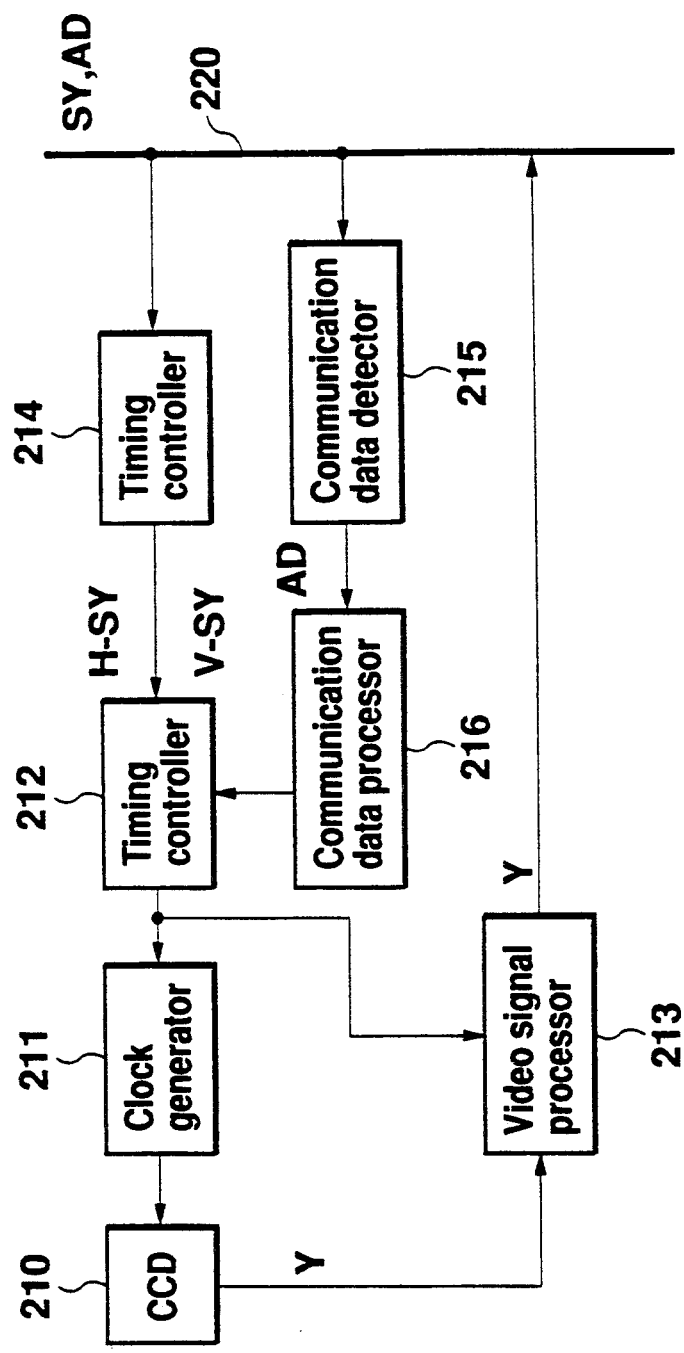
FIG. 14 is a block diagram of another embodiment of a solid-state image pickup apparatus according to the present invention.
Figure 15:
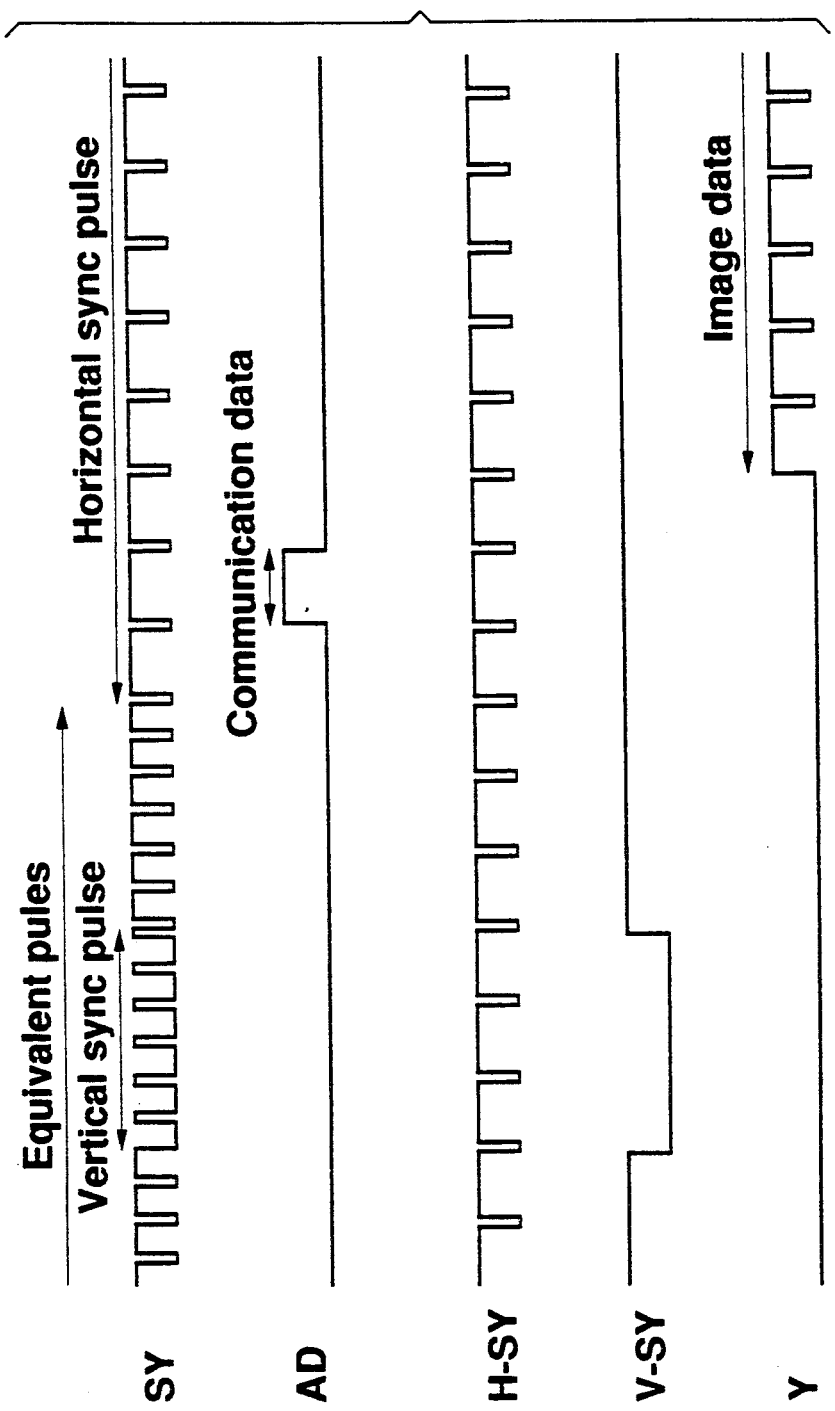
FIG. 15 shows the wave forms of synchronizing signals in the embodiment shown in FIG. 14.

FIG. 14 is a block diagram of another embodiment of a solid-state image pickup apparatus according to the present invention, and FIG. 15 shows the wave forms of the synchronizing signals in this embodiment.

A solid-state image pickup device (CCD) 210 is composed of a plurality of light receiving devices arranged in a matrix and stores information charges which correspond to the image pattern to which light is projected. The information charges are subsequently transferred in accordance with a transfer clock from a clock generator 211 and converted into a voltage by the output portion of the solid-state image pickup device 210 so as to be output as a video signal Y. The video signal Y output from the solid-state image pickup device 210 is supplied to a communication line 220 after being subjected to a signal processing such as sample holding and gain adjustment.

A timing controller 212 synchronizes the operation of the solid-state image pickup device 210 with a synchronizing signal SY which is transmitted on the communication line 220 and it is so designed as to set the operation timing of the clock generator 211 in accordance with the horizontal synchronizing signal H-SY and the vertical synchronizing signal V-SY output from a synchronizing signal detector 214. The synchronizing signal detector 214 detects the synchronizing signal SY from the communication line 220 and separates the synchronizing signal SY into the horizontal synchronizing signal H-SY and the vertical synchronizing signal V-SY. That is, the synchronizing signal SY transmitted on the communication line 220 is what is called a composite signal in which a horizontal synchronous pulse, a vertical synchronous pulse and an equivalent pulse are mixed with each other. By detecting the fall of the composite signal and removing the equivalent pulse of a ½ period, the horizontal synchronizing signal H-SY is obtained and by latching the composite signal at a timing a predetermined time behind the fall of the composite, the vertical synchronizing signal V-SY is obtained.

The synchronizing signal SY and communication data AD are transmitted to the communication line 220. The communication data AD, which is overlapped with a specific period of the synchronizing signal SY, is detected by the communication data detector 215 and supplied to a communication data processor 216. The communication data processor 216 is so composed as to judge the communication data AD and control the operation of the timing controller 212. For example, in the case of connecting a plurality of solid-state image pickup apparatuses provided with addresses to the communication line 220, the communication data processor 216 permits the operation of the timing controller 212 when it confirms the agreement of the communication data AD with the designated address. It is in a specific period other than the effective displaying period of the video signal Y, namely, in the blanking period of the video signal Y that the communication data AD is overlapped with the synchronizing signal SY. That is, the image data of the video signal Y and the communication data AD are separated in time series.

Figure 16:
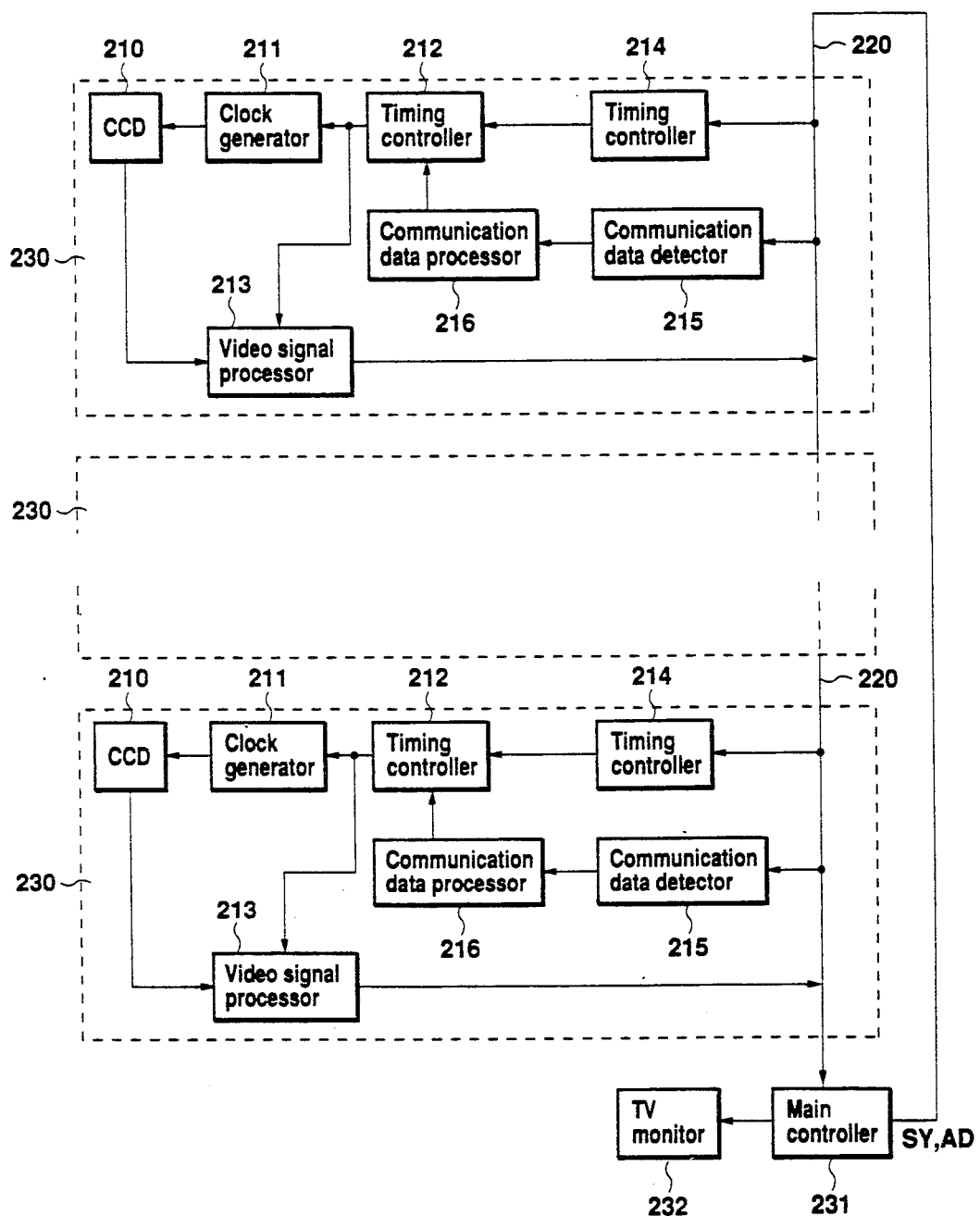
FIG. 16 is a block diagram of an image pickup system using the embodiment shown in FIG. 14.
Figure 17A:
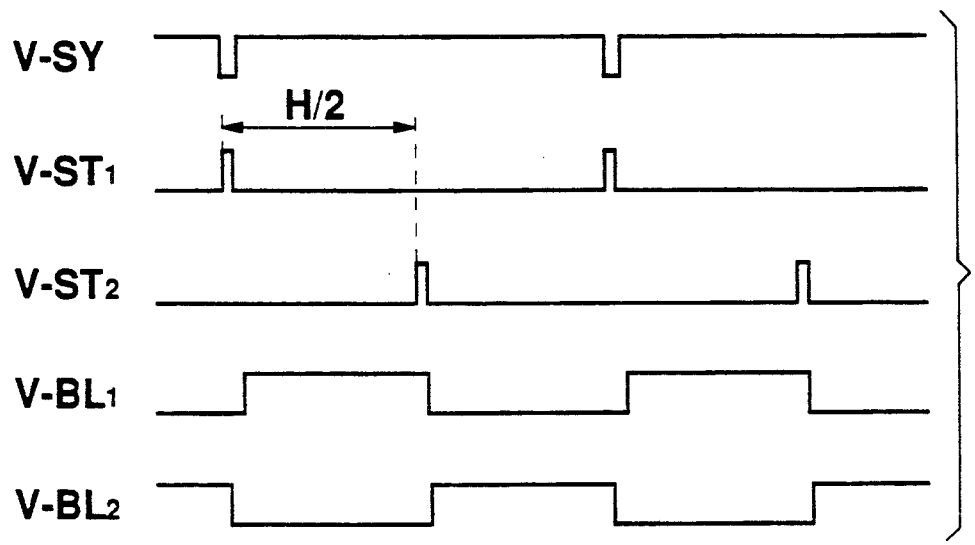
FIGS. 17a and 17b show the operation timing thereof.
Figure 17B:
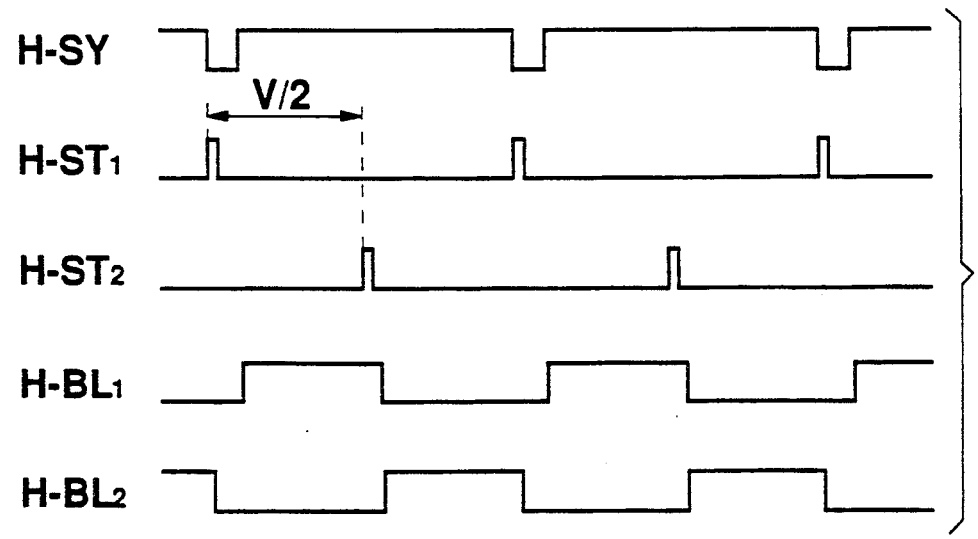

FIG. 16 is a block diagram of an image pickup system using the embodiment shown in FIG. 14, and FIG. 17 shows the operation timing thereof.

A solid-state image pickup apparatus 230 has the same structure as that shown in FIG. 14. A plurality of the solid-state image pickup apparatuses 230 provided with respective addresses are connected in series to the communication line 220. In the solid-state image pickup apparatus 230, the numbers of the pixels of the CCD 210 are set at ½ of those of the pixels of the reproducing screen in the horizontal and vertical directions, and the image information is output in the period of ½ of the horizontal scanning period and the vertical scanning period.

A main controller 231 for controlling the operation of each of the solid-state image pickup apparatuses 230 is connected to the communication line 220, and the synchronizing signal SY and the communication data AD are transmitted on the communication line 220. Each of the solid-state image pickup apparatuses 230 receives the synchronizing signal SY and the communication data AD from the main controller 231 and operates in synchronization with the synchronizing signal SY and in accordance with the communication data AD. The communication data AD designates the address of the solid-state image pickup apparatuses 230 and sets the output timing for the image information so that at most four solid-state image pickup apparatuses 230 from the plurality of solid-state image pickup apparatuses 230 are designated and the respective solid-state image pickup apparatuses 230 output image information at different timings.

The operation timing of the solid-state image pickup apparatus 230 is set by either of the horizontal scanning timing signals H-ST$_1$ and H-ST$_2$ which are output in accordance with the horizontal synchronizing signal H-SY and either of the vertical scanning timing signal V-ST$_1$ and V-ST$_2$ which are output in accordance with the vertical synchronizing signal V-SY. Either of the horizontal scanning timing signals H-ST$_1$ or H-ST$_2$ and either of the vertical scanning timing signal V-ST$_1$ and V-ST$_2$ are respectively selected in accordance with the communication data AD. The horizontal scanning timing signal H-ST$_2$ is set at a delay of ½ of the horizontal scanning period (H/2) with respect to the horizontal scanning timing signal H-ST$_1$ and the vertical scanning timing signal V-ST$_2$ is set at a delay of ½ of the vertical scanning period (V/2) with respect to the vertical scanning timing signal V-ST$_1$. The scanning timing signals are selected by the timing controller 212 on the basis of the output of the communication data processor 216. For example, by decoding the output of a counter which is reset by a synchronizing signal, the decoded value of the decoder for obtaining each scanning timing is set in accordance with the contents of the communication data AD which are judged by the communication data processor 216.

The video signal Y having the overlapping image data from at most four solid-state image pickup apparatuses 230 designated by the main controller 231 is input to the main controller 231, and the images from the predetermined solid-state image pickup apparatuses 230 are simultaneously displayed on the TV monitor 232 which is connected to the main controller 231.

In this way, the images from the solid-state image pickup apparatuses 230 designated in accordance with the communication data AD are displayed at the positions of the reproducing screen of the TV monitor 232 which are designated in accordance with the communication data AD. Different solid-state image pickup apparatuses 230 are selected by changing the addresses of the communication data AD. Thus, connection of more than four solid-state image pickup apparatuses 230 is enabled.

Figure 18:
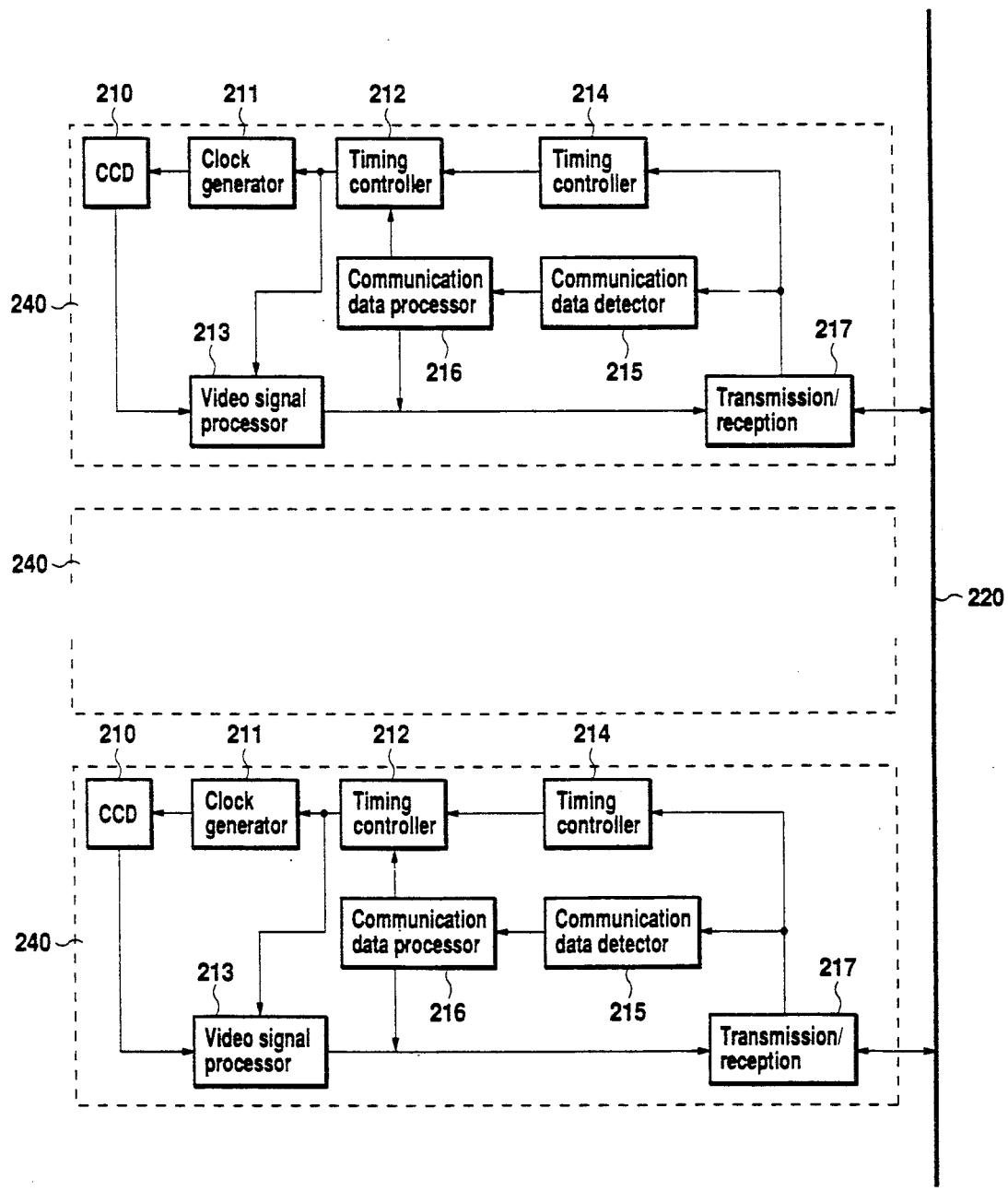
FIG. 18 is a block diagram of a communication system using the embodiment shown in FIG. 14.

FIG. 18 is a block diagram of the structure of a communication system using the embodiment shown in FIG. 14.

Each solid-state image pickup apparatuses 240 is provided with a transmission and reception circuit 217 for transmitting and receiving data to and from the communication line 220 and is connected to the communication line 220 through the transmission and reception circuit 217. The communication data processor 216 not only judges the communication data AD from the communication data detector 215 but also supplies the communication data to the transmission and reception circuit 217 in the state of being overlapped with the video signal Y after giving a predetermined processing to the communication data. In other words, the solid-state image pickup apparatus 240 has a transmitting function in addition to a receiving function and works as a communication terminal. In this way, if the solid-state image pickup apparatus 240 which operates in synchronization with a common synchronizing signal SY is utilized as a communication terminal, it is unnecessary to especially make the timing on the transmission side with the timing on the reception side at the time of transmitting and receiving data.

As the communication data AD, for example, a bi-phase sign for inverting the data at every bit is used, and data is transmitted in accordance with a basic clock for generating the synchronizing signal SY. In this case, the data of 910 bits (in the case of the NTSC system) can be transmitted in one horizontal scanning period.

In this embodiment, four images are displayed on one reproducing screen which is divided into four portions. It is also possible to display nine or sixteen images on the reproducing screen by using CCD's having a fewer pixels or culling out the image data at every appropriate number of pixels, and dividing the horizontal and vertical scanning periods in correspondence with the image data so as to operate the solid-state image pickup apparatuses at the corresponding timings.

According to this embodiment, it is possible to connect a multiplicity of solid-state image pickup apparatuses in accordance with the addresses designated by the communication data without enlarging the circuit structure, thereby constituting a large-scale image pickup system at a very low cost.

It is also possible to utilize the solid-state image pickup apparatus as a communication terminal so as to transmit image information and communication data by using the same communication line, thereby simplifying the communication line. In addition, since the operation of each solid-state image pickup apparatus is synchronous with a common synchronizing signal, it is unnecessary to make the timing on the transmission side with the timing on the reception side at the time of transmitting communication data, thereby facilitating the transmission and reception of data between solid-state image pickup apparatuses.

Figure 19:
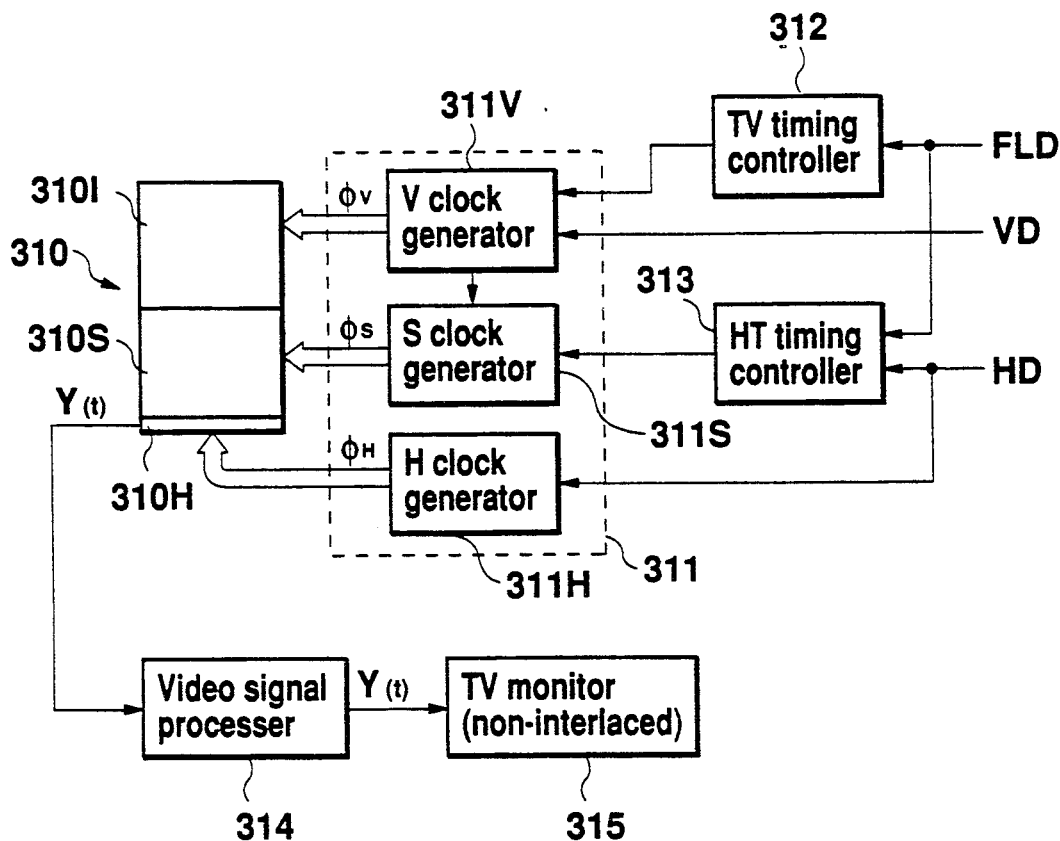
FIG. 19 is a block diagram of still another embodiment of a solid-state image pickup apparatus according to the present invention.
Figure 20:
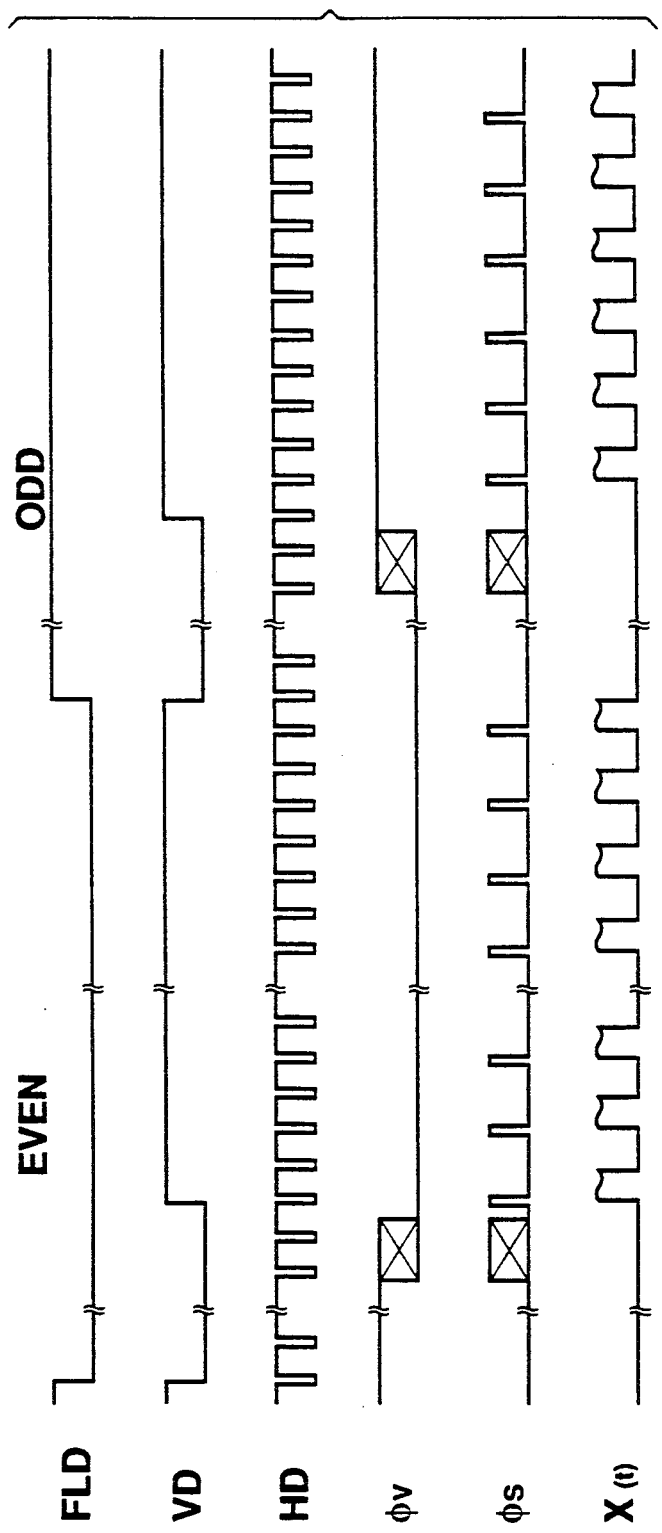
FIG. 20 shows the operation timing thereof.

FIG. 19 is a block diagram of still another embodiment of a solid-state image pickup apparatus according to the present invention, and FIG. 20 shows the operation timing thereof.

A CCD solid-state image pickup device 310 is composed of an image pickup portion 310I for receiving an image, a storing portion 310S for temporarily storing information charges and a horizontal transfer portion 310H for transferring and outputting the information charges to each line. The numbers of the pixels of the image pickup portions in the vertical direction and in the horizontal direction are set at ½ of the number of the pixels of the reproducing screen, as in the above-described embodiments. The numbers of the pixels of the storing portion 310S and the horizontal transfer portion 310H are also set in correspondence therewith.

A driving circuit 311 for driving the CCD 310 in pulsation is composed of a vertical transfer clock generator 311I, a storing transfer clock generator 311S, and a horizontal transfer clock generator 311H, and supplies the vertical transfer clock $\phi_V$, the storing transfer clock $\phi_S$ and the horizontal transfer clock $\phi_H$ to the corresponding portions of the CCD 310. These transfer clock generators 311I, 311S and 311H are operated in accordance with the vertical synchronizing signal VD and the horizontal synchronizing signal HD, and the operation mode is inverted for each field. The vertical transfer clock generator 311I supplies a potential for mixing the charge of the pixel on the (n−1)th line with the charge of the pixel on the n-th line in the odd field ODD and mixing the charge of the pixel on the n-th line with the charge of the pixel on the (n+1)th line in the even field EVEN during the period for storing information charges in the image pickup portion 310I in accordance with the output of a storing mode switching circuit 312 which is operated in accordance with a field identification signal FLD, and outputs a clock for transferring the information charges of the pickup portion 310I to the storing portion 310S after the elapse of a predetermined storing period. The storing transfer clock generator 311S generates a clock for receiving the information charges from the image pickup portion 310I and generates a pulse for transferring the received information charges to the horizontal transfer portion 310H for each line. The timing for generating the line transfer pulse is synchronous with the horizontal synchronizing signal HD in accordance with the output of a line transfer pulse timing generator 213 which is operated in accordance with the field identification signal FLD and the horizontal synchronizing signal HD and is set in a blanking period of horizontal scanning at intervals of 2 H periods in such a manner as to be delayed by 1 H period in the odd field ODD with respect to the even field EVEN. The timings for generating the line transfer pulse are staggered by 1 H period between the odd field ODD and the even field EVEN so that the signal corresponding to the mixed charges of the pixel on the (n−1)th line and the pixel on the n-th line is constantly 1 H period precedent to the signal corresponding to the mixed charges of the pixel on the n-th line and the pixel on the (n+1)th line because the information charges stored in the pickup portion 310I in the even field EVEN are output from the storing portion 310S to the subsequent odd field ODD through the horizontal transfer portion 310H. Therefore, if the video signal $X_{(t)}$ output from the CCD 310 has a signal displaying the image on an even-numbered horizontal scanning line in the odd field ODD, it has a signal on an odd-numbered horizontal scanning line in the even field EVEN.

The thus-obtained video signal X(t) is subjected to processings such as sample holding and amplification by a video signal processor 314 and supplied to a TV monitor 315 in the form of a video signal $Y_{(t)}$. On the TV monitor 315, the video signal $Y_{(t)}$ is reproduced by non-interlaced scanning. Accordingly, the odd-numbered horizontal scanning lines are drawn in a first field and the even-numbered horizontal scanning lines are drawn in a second field.

Figure 21A:
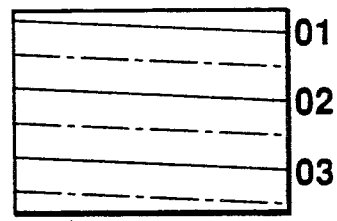
FIG. 21a and 21b schematically show the reproduced picture by the embodiment shown in FIG. 19.
Figure 21B:
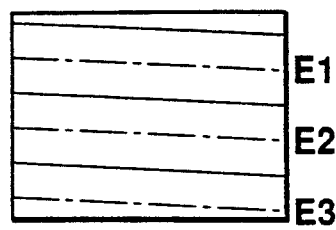

For example, in the case of picking up the image of an object such as that shown in FIG. 21A, the images of the regions O1 to O3 are first picked up in the odd field ODD and the horizontal lines are drawn, as shown in FIG. 21A. At this time, the video signal $Y_{(t)}$ generates a signal indicating the regions O1 to O3 during the odd-numbered horizontal scanning period and displays the image of the regions O1 to O3 on the odd-numbered horizontal scanning lines but does not display anything on the even-numbered horizontal scanning lines. On the other hand, in the even field EVEN, the images of the regions E1 to E3 are picked up and the horizontal lines are drawn, as shown in FIG. 21B. Since these horizontal scanning lines are drawn by non-interlaced scanning, they agree with the horizontal scanning lines shown in FIG. 21A. At this time, the video signal $Y_{(t)}$ generates a signal indicating the regions E1 to E3 during the even-numbered horizontal scanning period and displays the image of the regions E1 to E3 on the even-numbered horizontal scanning lines but does not display anything on the odd-numbered horizontal scanning lines. Accordingly, in the two fields, the images of the object are displayed on all the horizontal scanning lines on the reproducing screen.

Figure 1:
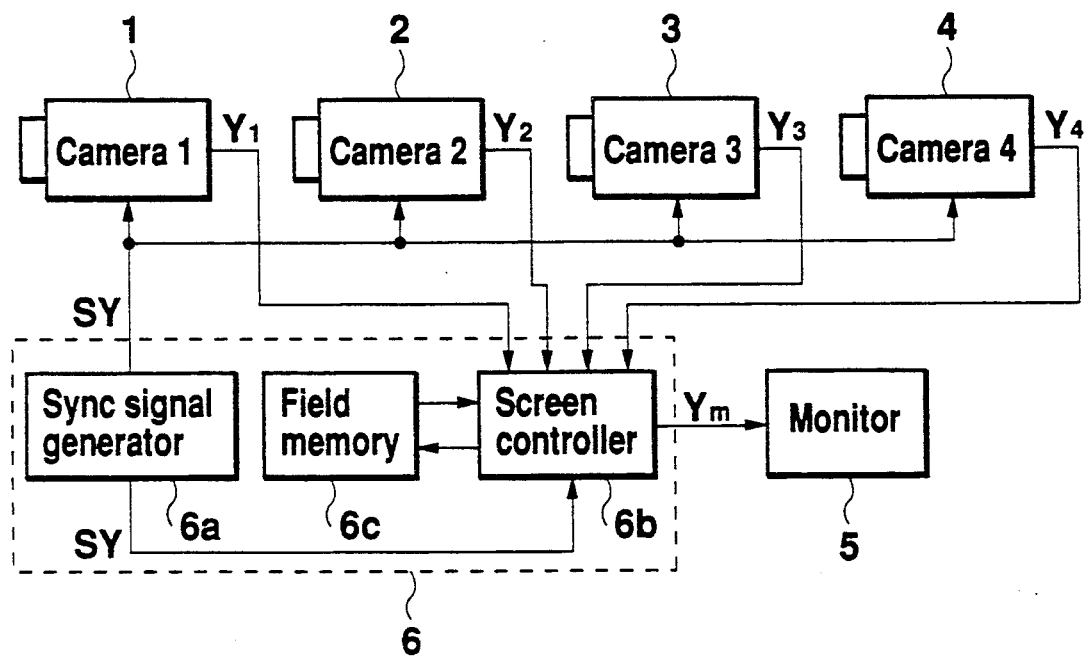
FIG. 1 is a block diagram of an example of a conventional image pickup system.
Figure 2:
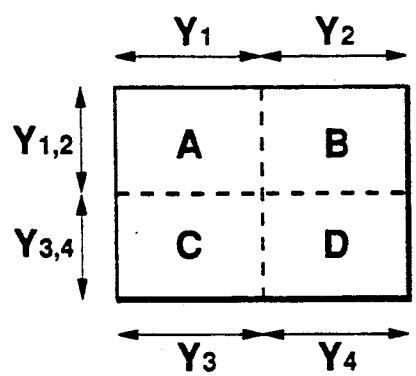
FIG. 2 shows the structure of a reproduced picture by the system shown in FIG. 1.
Figure 3:
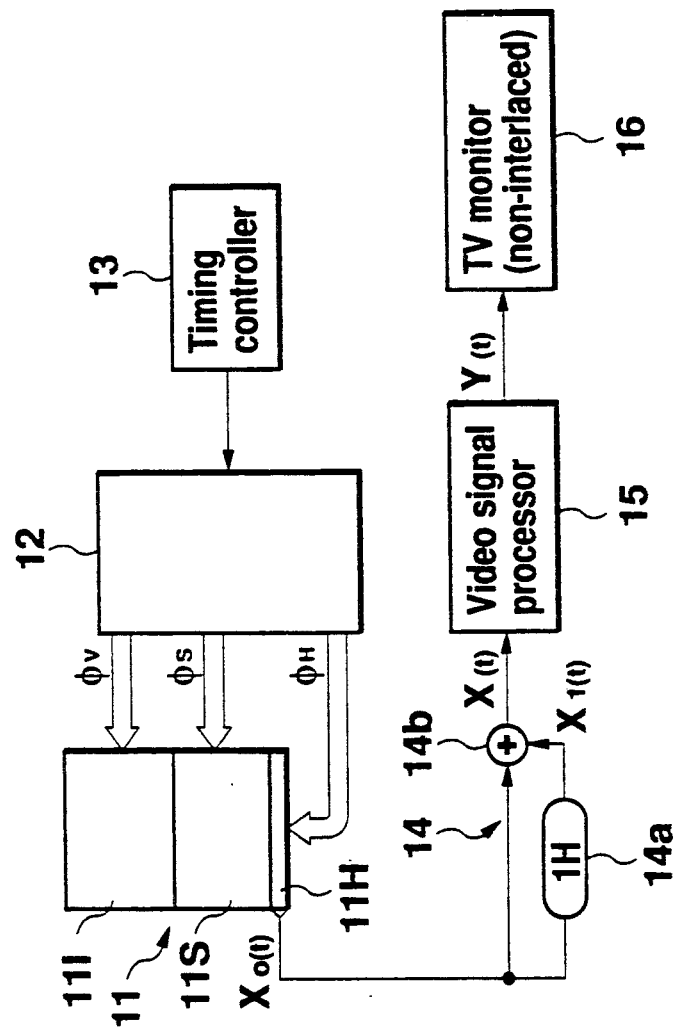
FIG. 3 is a block diagram of an example of an image pickup apparatus in the related art.
Figure 4:
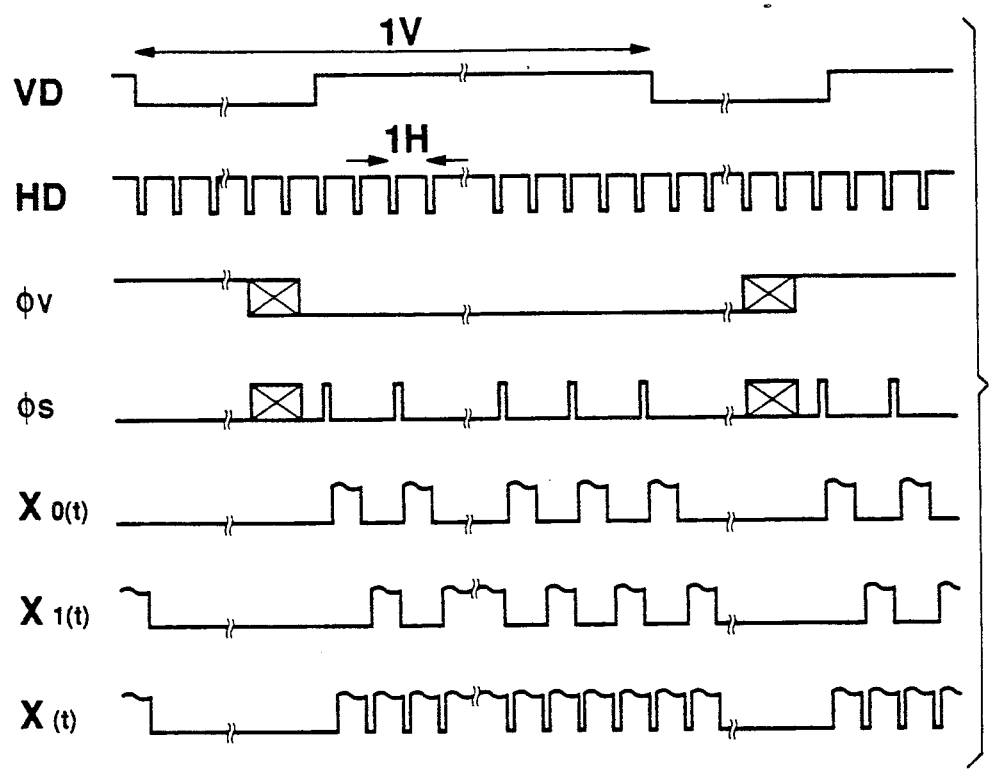
FIG. 4 shows an operation timing thereof.
Figure 5A:
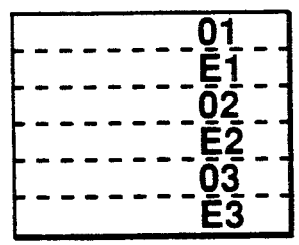
FIGS. 5a and 5b schematically show a reproduced picture by the example shown in FIG. 3.
Figure 5B:
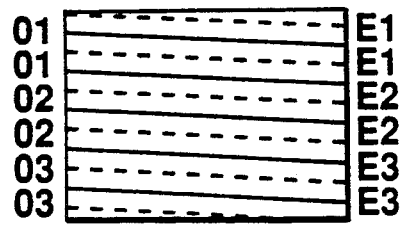

In this solid-state image pickup apparatus, the number of the horizontal scanning lines itself is smaller than in the case of interpolating the video signal $X_{(t)}$ for each 1 H period, but the position of the image is not inverted on the image on the reproducing screen unlike in the related art and the intervals of the displayed horizontal lines are uniform. Additionally, even in the solid-state image pickup apparatus shown in FIG. 3, if the interpolator 14 is eliminated, the position is not inverted on the reproduced screen and the number of the horizontal scanning lines is equal to that in this embodiment. In this case, however, the scanning lines on the lower side are eliminated from the horizontal scanning lines E1 to E3 and O1 to O3 each of which is composed of a pair of scanning lines, so that the interval between O1 and E2 becomes three times as large. Since the intervals between the horizontal scanning lines become nonuniform, the image becomes difficult to see.

The applicant of the present invention has actually confirmed as a result of testing solid-state image pickup apparatuses of the NTSC system having 120, 240 and 480 horizontal scanning lines, respectively, that the apparent difference in picture quality is small between the solid-state image pickup apparatus having 240 lines and the solid-state image pickup device apparatus 480 lines, but that the picture quality is clearly inferior in the case of 120 horizontal scanning lines to that in the case of 240 horizontal scanning lines. In the case of using a CCD (for the NTSC system) having 120 vertical pixels per field, if an image is picked up by the interlaced driving of the CCD and the image is displayed on the reproducing screen by the non-interlaced scanning, 240 horizontal scanning lines are obtained in the vertical line. Therefore, the CCD is sufficiently used as a TV camera.

Although a CCD of a frame transfer system is used in this embodiment, a similar operation is also possible by using a CCD of an interline transfer system or of a frame interline transfer system.

According to this embodiment, it is possible to produce a reproduced picture which is easy to see by using a CCD having pixels the number of which in the vertical and horizontal directions reduced to ½ of those of the reproducing screen. Thus, it is possible to provide a small-sized, light-weight and cheap solid-state image pickup apparatus.

Figure 22:
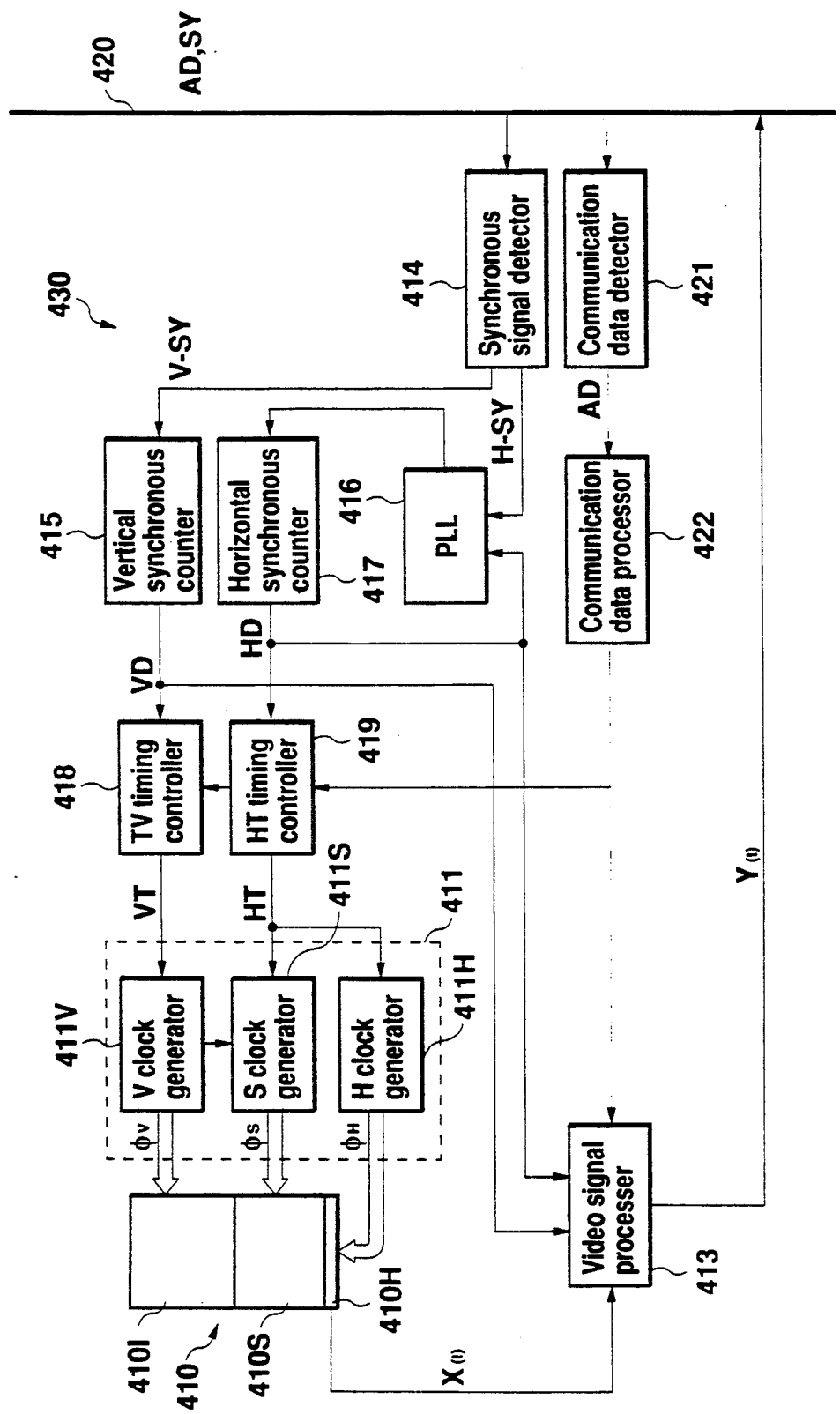
FIG. 22 shows a further embodiment of a solid-state image pickup apparatus according to the present invention.

FIG. 22 shows a further embodiment of a solid-state image pickup apparatus according to the present invention. A solid-state image pickup device 410 is a CCD of a frame transfer system and the numbers of the pixels of an image pickup portion 410I and a storing portion 410S in the vertical direction are set at ½ of the number of the pixels of the reproducing screen as in the above-described embodiments. A driving circuit 411 supplies the vertical transfer clock $\phi_V$, the storing transfer clock $\phi_S$ and the horizontal transfer clock $\phi_H$ to the corresponding portions of the solid-state image pickup device 410. In accordance with the clocks from the driving circuit 411, the video signal $X_{(t)}$ is output from the solid-state image pickup device 410. The video signal $X_{(t)}$ from the solid-state image pickup device 410 is processed by a video signal processor 413 and the predetermined video signal $Y_{(t)}$ is supplied to a communication line 420.

To the communication line 420, a plurality of solid-state image pickup devices 430 are connected in parallel or in series and a TV monitor for displaying a video signal which is supplied to the communication line 420 is connected to one end of the communication line 420.

The synchronizing signal SY and the communication data AD on the reproducing screen of the TV monitor are transmitted to the communication line 420 in the same way as in the embodiment shown in FIG. 14.

The synchronizing signal SY on the communication line 420 is detected by a synchronizing signal detector 414 and is separated into a vertical component V-SY and a horizontal component H-SY by the separation of the frequency. The vertical component V-SY is supplied to a vertical synchronous counter 415.

The vertical synchronous counter 415 is composed of a combination of an ordinary step counter and a decoder. The vertical synchronous counter 415 is reset by the vertical component V-SY which corresponds to the vertical synchronizing signal on the reproducing screen and counts the clocks of the horizontal scanning period (e.g., the horizontal synchronizing signals HD) and when the count value reaches a predetermined value, generates a pulse, thereby generating the vertical synchronizing signal VD of the vertical scanning period. The vertical synchronizing signal VD is supplied to a vertical transfer clock generator 411V of the driving circuit 411 through a vertical timing setting circuit 418.

On the other hand, the horizontal component H-SY from the synchronizing signal detector 414 is supplied to a horizontal synchronous counter 417 through a PLL (phase locked loop) 416. The PLL 416 synchronizes the counting operation of the horizontal synchronous counter 417 with the horizontal component H-SY, thereby synchronizing the horizontal synchronizing signal HD with the synchronizing signal which is supplied from the communication line 420. For this purpose, the PLL 416 compares the phase of the horizontal synchronizing signal HD with the phase of the horizontal component H-SY and adjusts the clock which is supplied to the horizontal synchronous counter 417 so that HD is synchronous with H-SY.

V-SY and H-SY are vertical and horizontal synchronizing signals on the reproducing screen, and VD and HD are vertical and horizontal synchronizing signals in the solid-state image pickup device 410.

The horizontal synchronous counter 417 is reset by the horizontal component H-SY of the synchronizing signal and counts the reference clocks supplied thereto so as to generate the horizontal synchronizing signal HD of the horizontal scanning period. The horizontal synchronizing signal HD is supplied to a storing transfer clock generator 411S and a horizontal transfer clock generator 411H of the driving circuit 411 through a horizontal timing setting circuit 419.

In this embodiment, the communication data AD which is transmitted through the communication line 420 contains data for mode selection in addition to the data for controlling the operation timings of the driving circuits 411 in the plurality of solid-state image pickup devices 410 in the same way as in the embodiment shown in FIG. 14.

The communication data AD is detected by a communication data detector 421 and processed by a communication data processor 422. The communication data processor 422 determines the scanning timing from the communication data AD in the same way as in the embodiment shown in FIG. 14, and the timing is supplied to the timing setting circuits 418, 419. The timing setting circuits 418, 419 change the timings of the corresponding synchronizing signals and supply the changed timings to the driving circuit 411. It is therefore possible to control the output of the solid-state image pickup device 410 in correspondence with the displaying position on the reproducing screen.

The communication data AD contains a signal for selecting a mode. The timing setting circuits 418, 419 are controlled in accordance with the selected mode. For example, in a first mode, the image from one solid-state image pickup device 430 is displayed at a portion ¼ of the reproducing screen and in a second mode, the image from one solid-state image pickup apparatus 430 is displayed on almost the entire part of the reproducing screen.

To state this concretely, in the first mode, the timing for a horizontal line transfer (output) is set for every horizontal scanning period, and the timings for the start of vertical transfer and line transfer are set at the start or ½ of the vertical scanning period and the start or ½ of the horizontal scanning period, respectively. In the second mode, the timing for a horizontal line transfer (output) is set at intervals of two horizontal scanning periods (once for every 2 horizontal scanning periods), and the timings for the start of vertical transfer and line transfer are set at the start of the vertical scanning period and the start of the horizontal scanning period, respectively.

The video signal $X_{(t)}$ from the solid-state image pickup device 410 is subjected to processing such as sample holding and gain adjustment by the video signal processor 413 and supplied to the communication line 420 as the ordinary video signal $Y_{(t)}$.

In the first mode, the video signal $X_{(t)}$ from the solid-state image pickup device 410 is processed in the same way as shown in FIGS. 14 to 18, thereby obtaining a signal for displaying an image in a predetermined region of ¼ of the reproducing screen. In the second mode, the video signal $X_{(t)}$ from the solid-state image pickup device 410 is processed in the same way as shown in FIGS. 19 and 20, thereby obtaining a signal for displaying an image on the entire part of the reproducing screen.

While there has been described what is at present considered to be preferred embodiments of the invention, it will be understood that various modifications may be made thereto, and it is intended that the appended claims cover all such modifications as fall within the true spirit and scope of the invention.

What is claimed is:

1. A solid-state image pickup apparatus for outputting a video signal displaying an image on a reproducing screen comprising:
   (A) a solid-state image pickup device having a plurality of photoelectric transducers which are arranged in a matrix in the horizontal and vertical directions and generating information charges which correspond to an image pattern having pixels the number of which in the vertical direction is equivalent to 1/n (n is an integer) of the number of the pixels of said reproducing screen;
   (B) a vertical transfer means for transferring said information charges in the vertical direction;
   (C) a horizontal transfer means for transferring and outputting to each horizontal line said information charges transferred in the vertical direction;
   (D) a driving means for driving said horizontal transfer means such that said horizontal transfer means transfers and outputs said information charges for one line in the period of 1/n of the horizontal scanning period on said reproducing screen; and
   (E) a timing control means for setting the operation timing of said driving means in correspondence with a synchronizing signal on said reproducing screen, thereby obtaining said video signal for displaying said image which is 1/n as large as said reproducing screen in horizontal and vertical directions in a specified region of said reproducing screen.

2. In an image display apparatus having a plurality of solid-state image pickup apparatuses for outputting the respective video signals and displaying the images picked up by the respective solid-state image pickup apparatuses on one reproducing screen, the improvement comprising:
   each of said solid-state image pickup apparatus including:
   (A) a solid-state image pickup device having a plurality of photoelectric transducers which are arranged in a matrix in the horizontal and vertical directions and generating information charges which correspond to an image pattern having pixels the number of which in the vertical direction is equivalent to 1/n (n is an integer) of the number of the pixels of said reproducing screen;
   (B) a vertical transfer means for transferring said information charges in the vertical direction;
   (C) a horizontal transfer means for transferring and outputting to each horizontal line said information charges transferred in the vertical direction;
   (D) a driving means for driving said horizontal transfer means such that said horizontal transfer means transfers and outputs said information charges for one line in the period of 1/n of the horizontal scanning period on said reproducing screen;
   (E) a timing control means for setting the operation timing of said driving means in correspondence with a synchronizing signal on said reproducing screen; and
   (F) a composite video signal generating means for compounding said video signals from said plurality of solid-state image pickup apparatuses and displaying said images picked up by said solid-state image pickup apparatuses in the corresponding regions which are obtained by dividing said reproducing screen into n regions;
   wherein said driving means of said solid-state image pickup apparatuses are operated in accordance with a common synchronizing signal, and
   said timing control means of said solid-state image pickup apparatuses set the operation timings of the corresponding driving means of the corresponding solid-state image pickup apparatuses at the timings which are different from each other by a multiple of 1/n of the horizontal scanning period and the vertical scanning period.

3. An image display apparatus according to claim 2, wherein said plurality of said solid-state image pickup apparatuses are connected in parallel to each other and a common synchronizing signal is supplied to each of the solid-state image pickup apparatuses.

4. An image display apparatus according to claim 1, wherein said plurality of said solid-state image pickup apparatuses are connected in parallel to each other and a synchronizing signal is supplied to solid-state image pickup apparatuses in series in such a manner that a synchronizing signal supplied to the solid-state image pickup apparatus at a first stage is supplied from the output side of said solid-state image pickup apparatus to the solid-state image pickup apparatus at the next stage, and so forth.

5. A solid-state image pickup apparatus for outputting a video signal displaying an image on a reproducing screen comprising:
(A) a solid-state image pickup device having a plurality of photoelectric transducers which are arranged in a matrix in the horizontal and vertical directions and generating information charges which correspond to an image pattern;
(B) a vertical transfer means for transferring said information charges in the vertical direction;
(C) a horizontal transfer means for transferring and outputting to each horizontal line said information charges transferred in the vertical direction;
(D) a driving means for driving said vertical transfer means and said horizontal transfer means such that said vertical transfer means transfers said information charges in the vertical direction in the period of 1/n of the vertical scanning period on said reproducing screen and said horizontal transfer means transfers and outputs said information charges for one line in the period of 1/n of the horizontal scanning period on said reproducing screen; and
(E) a timing control means for setting the operation timing of said driving means in correspondence with a synchronizing signal on said reproducing screen, thereby obtaining said video signal for displaying said image which is 1/n as large as said reproducing screen in horizontal and vertical directions in a specified region of said reproducing screen.

6. An image display apparatus having a plurality of solid-state image pickup apparatuses for outputting the respective video signals and displaying the images picked up by the respective solid-state image pickup apparatuses on one reproducing screen, the improvement comprising:
each of said solid-state image pickup apparatus including:
(A) a solid-state image pickup device having a plurality of photoelectric transducers which are arranged in a matrix in the horizontal and vertical directions and generating information charges which correspond to an image pattern;
(B) a vertical transfer means for transferring said information charges in the vertical direction;
(C) a horizontal transfer means for transferring and outputting to each horizontal line said information charges transferred in the vertical direction;
(D) a driving means for driving said vertical transfer means and said horizontal transfer means such that said vertical transfer means transfers said information charges in the vertical direction in the period of 1/n of the vertical scanning period on said reproducing screen and said horizontal transfer means transfers and outputs said information charges for one line in the period of 1/n of the horizontal scanning period on said reproducing screen;
(E) a timing control means for setting the operation timing of said driving means in correspondence with a synchronizing signal on said reproducing screen; and
(F) a composite video signal generating means for compounding said video signals from said plurality of solid-state image pickup apparatuses and displaying said images picked up by said solid-state image pickup apparatuses in the corresponding regions which are obtained by dividing said reproducing screen into n regions;
wherein said driving means of said solid-state image pickup apparatuses are operated in accordance with a common synchronizing signal, and
said timing control means of said solid-state image pickup apparatuses set the operation timings of the corresponding driving means of the corresponding solid-state image pickup apparatuses at the timings which are different from each other by a multiple of 1/n of the horizontal scanning period and the vertical scanning period.

7. An image display apparatus according to claim 6, wherein said plurality of said solid-state image pickup apparatuses are connected in parallel to each other and a common synchronizing signal is supplied to each of the solid-state image pickup apparatuses.

8. An image display apparatus according to claim 6, wherein said plurality of said solid-state image pickup apparatuses are connected in parallel to each other and a synchronizing signal is supplied to solid-state image pickup apparatuses in series in such a manner that a synchronizing signal supplied to the solid-state image pickup apparatus at a first stage is supplied from the output side of said solid-state image pickup apparatus to the solid-state image pickup apparatus at the next stage, and so forth.

9. A solid-state image pickup apparatus for outputting a video signal displaying an image on a reproducing screen comprising:
(A) a solid-state image pickup device having a plurality of photoelectric transducers which are arranged in a matrix in the horizontal and vertical directions and generating information charges which correspond to an image pattern;
(B) a vertical transfer means for transferring said information charges in the vertical direction;
(C) a horizontal transfer means for transferring and outputting to each horizontal line said information charges transferred in the vertical direction;
(D) a driving means for driving said horizontal transfer means and said vertical transfer means so as to transfer and output said information charges at intervals of a predetermined period;
(E) a detector for detecting a synchronizing signal and communication data on said reproducing screen which are supplied from a communication line;
(F) a timing controller for controlling the output timing of said video signal by controlling said driving means in accordance with said synchronizing signal; and
(G) a data processor for judging the contents of said communication data and controlling said timing controller in accordance with the contents of said communication data so as to change said output timing of said video signal; setting means for setting the operation timing of said driving means in correspondence with a synchronizing signal on said reproducing screen, thereby supplying a video signal which is synchronous with said synchronizing signal supplied through said communication line to said communication line.

10. A solid-state image pickup apparatus according to claim 9, wherein said communication data is overlapped with said synchronizing signal for a specified period.

11. A solid-state image pickup apparatus according to claim 9, wherein said solid-state image pickup device has pixels the number of which in the vertical direction is equivalent to 1/n of the number of the pixels of said reproducing screen, and said driving means controls said vertical transfer means and said horizontal transfer means such that said information charges stored in said solid-state image pickup device are output in the period of 1/n of the horizontal and vertical scanning periods on said reproducing screen.

12. A solid-state image pickup apparatus for supplying video signals for displaying images in the odd field and the even field to a reproducing screen, said solid-state image pickup apparatus comprising:

(A) a solid-state image pickup device having a plurality of photoelectric transducers which are arranged in a matrix in the horizontal and vertical directions and generating information charges which correspond to an image pattern;

(B) a vertical transfer means for transferring said information charges in the vertical direction;

(C) a horizontal transfer means for transferring and outputting to each horizontal line said information charges transferred in the vertical direction;

(D) a driving means for driving said vertical transfer means so as to transfer said information charges to each horizontal line in the vertical direction at intervals of two horizontal scanning periods on said reproducing screen and driving said horizontal transfer means so as to transfer and output said information charges to every horizontal line;

(E) a timing controller for setting the timings for the vertical transfer of said information charges to the odd field and the even field by said vertical transfer means are set at timings which are different from each other by one horizontal scanning period; and (F) a signal processor for setting one vertical scanning period of a signal output from said horizontal transfer means at a period an integral number of times as large as one horizontal scanning period, thereby producing an image with said video signal having horizontal lines uniformly arranged in both odd and even fields on said reproducing screen.

13. A solid-state image pickup apparatus for supplying video signals for displaying images in the odd field and the even field to a reproducing screen, said solid-state image pickup apparatus comprising:

(A) a solid-state image pickup device having a plurality of photoelectric transducers which are arranged in a matrix in the horizontal and vertical directions and generating information charges which correspond to an image pattern;

(B) a vertical transfer means for transferring said information charges in the vertical direction;

(C) a horizontal transfer means for transferring and outputting to each horizontal line said information charges transferred in the vertical direction;

(D) a driving means for driving said vertical transfer means and said horizontal transfer means;

(E) a timing controller for setting the timings for the vertical transfer and the horizontal transfer of said information charges by said vertical transfer means and said horizontal transfer means; and (F) a mode selecting means for changing the value set by said timing controller so as to switch the operation mode of said solid-sate image pickup device;

said mode selecting means selecting the mode from at least the following two modes:

(a) a first mode in which said information charges are transferred to each horizontal line in every horizontal scanning period in the period of ½ of one vertical scanning period so as to display an image ½ as large as said reproducing screen in the vertical and horizontal directions in a specified region of said reproducing screen; and (b) a second mode in which said information charges are transferred in the vertical direction to each horizontal line in every horizontal scanning period and setting the timings for the vertical transfer of said information charges in the odd and even fields at timings different from each other by one horizontal scanning period so as to display an image at the substantially entire part of said reproducing screen.

14. A solid-state image pickup apparatus according to claim 13, further comprising a detector for detecting communication data which is supplied from a communication line, and which contains a mode selection signal, said mode selecting means switching said modes in accordance with the contents of said mode selection signal.

15. A solid-state image pickup apparatus according to claim 14, wherein said detector also detects a synchronizing signal which is supplied from said communication line, and said timing controller sets said timings in accordance with said synchronizing signal, thereby supplying a video signal which is synchronous with said synchronizing signal supplied from said communication line to said communication line.

* * * * *